(12) United States Patent
Trim et al.

(10) Patent No.: US 11,443,394 B2
(45) Date of Patent: Sep. 13, 2022

(54) BLOCKCHAIN BASED BUILDING ACTION MANAGEMENT

(71) Applicant: International Business Machines Corporation, Armonk, NY (US)

(72) Inventors: Craig M. Trim, Glendale, CA (US); Ahmed Nassar, Austin, TX (US); Victor Povar, Burnaby (CA); Sarbajit K. Rakshit, Kolkata (IN); Shawn D. Hennessy, Falmouth, ME (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 418 days.

(21) Appl. No.: 16/361,969

(22) Filed: Mar. 22, 2019

(65) Prior Publication Data
US 2020/0302562 A1 Sep. 24, 2020

(51) Int. Cl.
*G06Q 50/16* (2012.01)
*G06F 16/28* (2019.01)
(Continued)

(52) U.S. Cl.
CPC ......... *G06Q 50/163* (2013.01); *G06F 16/28* (2019.01); *G06Q 10/20* (2013.01); *G06Q 90/205* (2013.01)

(58) Field of Classification Search
CPC ...... G06Q 50/163; G06Q 10/20; G06Q 3/018; G06F 16/28
See application file for complete search history.

(56) References Cited

U.S. PATENT DOCUMENTS 9,262,789 B1 * 2/2016 Tofte .................. G06Q 10/20
10,322,671 B1 * 6/2019 Mesic, Jr. ............ B60Q 9/00
(Continued)

FOREIGN PATENT DOCUMENTS

CN 105160600 A * 12/2015
CN 109412789 A * 3/2019
(Continued)

OTHER PUBLICATIONS

B. Pietras, "New frontiers in driverless vehicles," in Engineering & Technology, vol. 10, No. 3, pp. 64-67, Apr. 2015. (Year: 2015).*
(Continued)

*Primary Examiner* — Gerardo Araque, Jr.
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: obtaining first building event transaction data of a building using a first data source; recording a first blockchain block in a blockchain ledger, the first blockchain block having a timestamp and the first building event transaction data; obtaining second building event transaction data of the building using a second data source; recording a second blockchain block in the blockchain ledger, the second blockchain block having a timestamp, and the second building event transaction data; examining data of the first blockchain block and the second blockchain block; and providing one or more output in dependence on the examining.

19 Claims, 11 Drawing Sheets

(51) Int. Cl.
  *G06Q 10/00* (2012.01)
  *G06Q 90/00* (2006.01)

(56) References Cited

U.S. PATENT DOCUMENTS

| | | | |
|---|---|---|---|
| 11,022,978 B1* | 6/2021 | Konrardy | B60R 25/252 |
| 2010/0161370 A1* | 6/2010 | Bloom | G08G 1/096844 |
| | | | 701/467 |
| 2015/0051829 A1* | 2/2015 | Gearhart | G01C 21/3682 |
| | | | 701/467 |
| 2017/0046799 A1* | 2/2017 | Chan | H04L 9/3247 |
| 2017/0103472 A1* | 4/2017 | Shah | G06K 9/00597 |
| 2017/0286880 A1 | 10/2017 | Wiig et al. | |
| 2018/0115425 A1 | 4/2018 | Dechu et al. | |
| 2018/0137465 A1 | 5/2018 | Batra et al. | |
| 2018/0170414 A1* | 6/2018 | Arndt | B61L 27/0094 |
| 2018/0176228 A1 | 6/2018 | He et al. | |
| 2019/0361437 A1* | 11/2019 | Wilson | G06F 40/58 |
| 2020/0186509 A1* | 6/2020 | Kursun | H04L 63/1466 |

FOREIGN PATENT DOCUMENTS

| | | | | |
|---|---|---|---|---|
| JP | 2019045370 A * | 3/2019 | | |
| WO | WO-2014139821 A1 * | 9/2014 | | G01C 21/36 |
| WO | WO-2015134376 A1 * | 9/2015 | | G06F 16/29 |
| WO | WO2018107290 | 6/2018 | | |
| WO | WO-2019010459 A1 * | 1/2019 | | H04L 9/0637 |
| WO | WO-2020111954 A1 * | 6/2020 | | G06Q 10/04 |

OTHER PUBLICATIONS

Cummins, C. (Mar. 5, 2016). Driverless cars pick up momentum. Sydney Morning Herald Retrieved from https://dialog.proquest.com/professional/docview/1771276601?accountid=131444 (Year: 2016).*

M. H. Ang, "Achieving mobility on demand using autonomous vehicles," 2015 6th International Conference on Power Electronics Systems and Applications (PESA), Hong Kong, China, 2015, pp. 1-5, doi: 10.1109/PESA.2015.7398961. (Year: 2015).*

Jewstar, "Tech Trends That'll Change Showings," http://blog.newstarrealty.com/index.php/2016/04/21/tech-trends-hatll-change-showings/, Newstar Realty & Inv., Apr. 21, 2016, 60 pages (Year: 2016).*

H. Billhardt et al., "Agreement Technologies for Coordination in Smart Cities," Applied Sciences, vol. 8, (5), pp. n/a, May 2018 (Year: 2018).*

X. Liu, Y. Zhao and C. Qiao, "Autonomous vehicle dispatching for person evacuation," 2019 IEEE Global Communications Conference, GLOBECOM 2019—Proceedings, 2019 (Year: 2019).*

D. Cocrlea et al, "Blockchain in Intelligent Transportation Systems," Electronics, vol. 9, (10), pp. 1682, 2020 (Year: 2020).*

R. Grosso et al., "Collecting Built Environment Information Using UAVs: Time and Applicability in Building Inspection Activities," Sustainability, vol. 12, (11), pp. 4731, 2020 (Year: 2020).*

P. Mell, et al. *"The NIST Definition of Cloud Computing"*, NIST Special Publication 800-145, Sep. 2011, Gaithersburg, MD.

I. Belle, *"The Architecture, Engineering, and Construction Industry and Blockchain Technology,"* Digital Culture, 279-284, 2017.

Z. Turk, et al. *"Potentials of Blockchain Technology for Construction Management,"* Procedia Engineering 196, 638-645, 2017.

* cited by examiner

BLOCKCHAIN BASED BUILDING ACTION MANAGEMENT

FIELD OF INVENTION

The present disclosure relates in general to building actions and in particular to blockchain based building actions.

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location based services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining first building event transaction data of a building using a first data source; recording a first blockchain block in a blockchain ledger, the first blockchain block having a timestamp and the first building event transaction data; obtaining second building event transaction data of the building using a second data source; recording a second blockchain block in the blockchain ledger, the second blockchain block having a timestamp, and the second building event transaction data; examining data of the first blockchain block and the second blockchain block; and providing one or more output in dependence on the examining.

In another aspect, a computer program product can be provided. The computer program product can include a computer readable storage medium readable by one or more processing circuit and storing instructions for execution by one or more processor for performing a method. The method can include, for example: obtaining first building event transaction data of a building using a first data source; recording a first blockchain block in a blockchain ledger, the first blockchain block having a timestamp and the first building event transaction data; obtaining second building event transaction data of the building using a second data source; recording a second blockchain block in the blockchain ledger, the second blockchain block having a timestamp, and the second building event transaction data; examining data of the first blockchain block and the second blockchain block; and providing one or more output in dependence on the examining.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining first building event transaction data of a building using a first data source; recording a first blockchain block in a blockchain ledger, the first blockchain block having a timestamp and the first building event transaction data; obtaining second building event transaction data of the building using a second data source; recording a second blockchain block in the blockchain ledger, the second blockchain block having a timestamp, and the second building event transaction data; examining data of the first blockchain block and the second blockchain block; and providing one or more output in dependence on the examining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
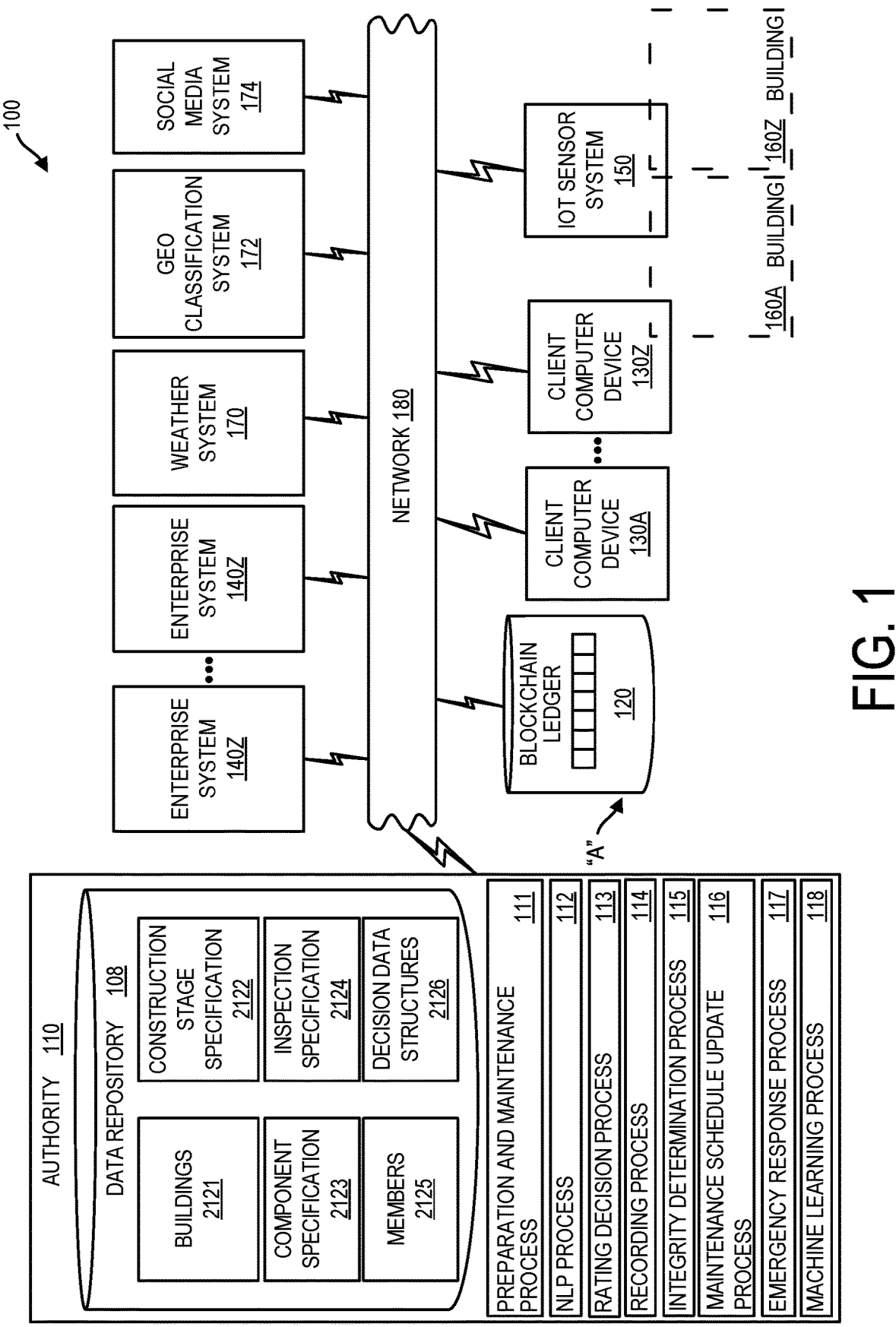
FIG. 1 depicts a system having an authority, a blockchain ledger, client computer devices, an IoT sensor system, enterprise systems, a weather system, a geoclassification system, and a social media system according to one embodiment.

System 100 for managing building events with use of a blockchain ledger is illustrated in FIG. 1. System 100 can include authority 110 having an associated data repository 108, blockchain ledger 120 at "A", client computer devices 130A-130Z, enterprise systems 140A-140Z, Internet of Things (IoT) sensor system 150, weather system 170, geo-classification system 172, social media system 174 in communication with one another via network 180.

System 100 can include numerous devices and systems as depicted in FIG. 1 which can be computing node based systems and devices connected via network 180. Network 180 can be a physical network and/or a virtual network. A physical network can be for example a physical telecommunications network connecting numerous computing nodes or systems such as computer servers and computer clients. A virtual network can for example combine numerous physical networks or parts thereof into a logical virtual network. According to another example numerous virtual networks can be defined over a single physical network.

According to one embodiment, authority 110 can be external to blockchain ledger 120 at "A", client computer devices 130A-130Z, IoT sensor system 150, enterprise systems 140A-140Z, weather system 170, geoclassification system 172, and social media system 174. According to another embodiment one or more of authority 110, blockchain ledger 120 at "A", client computer devices 130A-130Z, IoT sensor system 150, enterprise systems 140A-140Z, weather system 170, geoclassification system 172, and social media system 174 can be collocated with one another. Blockchain ledger 120 at "A" can be a distributed ledger that can be distributed to be associated with each of a plurality of members of a blockchain network, e.g. members or users of client computer devices 130A-130Z and/or enterprise members that operate enterprise systems 140A140Z. Blockchain ledger 120 at "A" can be an instance of ledger configured as a database that is associated to authority 110.

According to one embodiment, blockchain ledger 120 at "A" can be an immutable ledger and can be provided by a blockchain ledger. Blockchain ledger 120 at "A" can include a list of records called blocks, which can be linked together using cryptography. Each block of blockchain ledger 120 at "A" can include a cryptographic hash of transaction data (that is, a digital fingerprint), a cryptographic hash of a previous block, a timestamp, and the transaction data. The hash of the transaction data can include a Merkle tree root hash. Blockchain ledger 120 can be resistant to modification of data. Blockchain ledger 120 can be configured so that once a block of data is recorded into blockchain ledger 120 the data cannot be altered retroactively without alteration of all subsequent blocks. According to one embodiment, alteration of blockchain ledger 120 can be restricted and can be permissible, e.g. only on consensus of blockchain network members. Each block of a blockchain ledger 120 can contain include a cryptographic hash of transaction data, a cryptographic hash of a previous block, a timestamp, and the transaction data. A previous block hash can link the blocks together and prevent any block from being altered or a block from being inserted between two existing blocks and accordingly each subsequent block strengthens the verification of the previous block and, hence, the entire blockchain. The described process renders the blockchain tamper evident leading the attribute of immutability.

Blockchain ledger 120 can be a distributed ledger that can be distributed among members of a blockchain network. According to one embodiment, blockchain ledger 120 can store building event data. According to one embodiment building event data transactions can be recorded to blockchain ledger 120 as blocks of a blockchain. Building event transactions, according to one embodiment, can include building construction events, building sensed condition events, and building code inspection events. Thus, blockchain ledger 120 according to one embodiment can store an immutable record specifying data of events subject to building management by system 100. Because blockchain ledger 120 includes an order in dependence on a time at which timestamped blocks are added to blockchain ledger 120, blockchain ledger 120 specifies an order of building events that are specified within blockchain ledger 120. According to one embodiment, blockchain ledger 120 can store transaction data with respect to buildings in addition to or in place of building construction events, building sensed condition events and building code inspection events, e.g. according to one embodiment can record financial transaction events for a building, e.g. sale events, lending events, insurance acquisition events.

Authority 110 can mediate rights of members with respect to blockchain ledger 120. Authority 110 can differentiate rights to blockchain ledger 120 between different classifications of members. For example, some classifications of members can be granted transaction authoring and viewing rights with respect to blockchain ledger 120 and some classifications of members can be granted viewing rights only with respect to blockchain ledger 120, but not blockchain block authoring rights.

Members of a blockchain defined by blockchain ledger 120 can include e.g. building owner members, IoT enterprise members, inspector members, financial institution members, and other classifications.

Client computer devices 130A-130Z can be used by respective users of system 100. Each client computer device of client computer devices 130A-130Z can have a respective user. Client computer devices 130A-130Z can be provided by mobile client computer devices, e.g. a smartphone, laptop, smartwatch, and the like. Users of client computer devices 130A-130Z can be individual human users. Such users may or may not be associated to an enterprise that operates an enterprise system of enterprise systems 140A-140Z. Client computer devices 130A-130Z can be mobile computer devices, movable between locations, internal and external to buildings 160A-160Z. Client computer devices 130A-130Z can be wireless client computer devices. Client computer devices can be connected to 180 by alternative radio communication technologies e.g. via cellular network and/or wireless LAN, e.g. IEEE 802.11 wireless communication technologies.

IoT sensor system 150 can include a plurality of IoT sensor devices distributed throughout a plurality of buildings such as buildings 160A-160Z. Each building can include one or more IoT sensor device for outputting sensor data indicative of a level degradation of a building component. IoT sensor devices can include, e.g. humidity sensor IoT devices, heat sensor IoT devices, strain sensing IoT devices, pressure sensing IoT devices, and camera sensor IoT devices. IoT devices according to one embodiment can be fixed on a building. According to one embodiment, IoT devices can be mobile IoT devices, moveable between buildings. According to one embodiment, an IoT device can be provided by an autonomous vehicle mounted IoT device that is moveable between buildings.

Enterprise systems 140A-140Z can be systems that are operated by enterprises, such as government enterprises or business enterprises. Enterprises having an associated enterprise system can be enterprises that are stakeholders in real estate properties having buildings, e.g. government enterprises, building construction enterprises, real estate brokerage enterprises, nongovernment disaster relief enterprises, IOT sensor enterprises, inspector enterprises (private or government) and/or financial institution enterprises. Members who have registered with authority 110 to obtain viewing and/or authoring rights in instances of blockchain ledger 120 managed by authority 110 can represent an enterprise or be individual members.

Weather system 170 can be configured to provide weather data with respect to an area being serviced by system 100. Weather data can include e.g. temperature data, precipitation data, and wind data. Weather system 170 can store historical weather data associated to different subareas of an area being services. Weather system 170 can provide predictive data predicting future weather events such as natural disaster events including, e.g. hurricanes and tornados.

Geoclassification system 172 can associate venues to spatial coordinate ranges associated to the venues. Geoclassification system 172 can include enhanced spatial maps pre-marked with tags to indicate uses associated with map features. Map features can include venues having associated venue areas including venue building areas and/or associated venue parking areas. An enhanced map can include tags specifying usage classifications of venues, e.g. residential, business, public and the like. An enhanced map can be tagged to tag features of a map including e.g. roads, bodies of water and infrastructure features such as building walls (exterior and interior) defining enterprise venues. In some cases, an enhanced map can be tagged so that that different parts of a building are tagged differently, e.g. a doorway can be tagged differently from a conference room. Geoclassification system 172 can provide data tags associated to locations that specify uses associated with various locations. Geoclassification system 172 can cognitively map venues identified by venue identifiers, e.g. names, addresses, classifications, and the like, to coordinate location ranges associated to the various venues. Accordingly, authority 110 querying geoclassification system 172, with location data in the form of coordinate location data, can return an identifier venue. Further, geoclassification system 172 can cognitively map venues that are listed in geo-classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geoclassification system 172 can associate e.g. identifiers for the venue, ranges and coordinate locations associated with the venue, features associated to the venue, such as building infrastructure features, parking lot features, and other features. Geoclassification system 172 according to one embodiment can be provided by GOOGLE MAPS® (GOOGLE MAPS® is a registered trademark of Google, Inc.).

Social media system 174 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Authority 110 can include a messaging system in one embodiment. During a process of registration wherein a user of system 100 registers as a registered user of system 100, a user sending registration data can send with permission data defining the registration data a permission that grants access by authority 110 to data of the user within social media system 174. On being registered, authority 110 can examine data of social media system 174 e.g. to determine whether first and second users are in communication with one another via a messaging system of social media system 174. A user can enter registration data using a user interface displayed on a client computer device of client computer devices 130A-130Z. Entered registration data can include e.g. name, address, social media account information, other contact information, biographical information, background information, preferences information, and/or permissions data e.g. can include permissions data allowing authority 110 to query data of a social media account of a user provided by social media system 174 including messaging system data and any other data of the user. When a user opts-in to register into system 100 and grants system 100 permission to access data of social media system 174, system 100 can inform the user as to what data is collected and why, that any collected personal data may be encrypted, that the user can opt out at any time, and that if the user opts out, any personal data of the user is deleted.

Embodiments herein recognize that various advantages can be provided with system 100 which is configured to provide a secure record of building events and other events with respect to buildings. As set forth herein for example, system 100 can provide a government enterprise with an indication of possible available shelters in the event of a natural disaster. System 100 can predict danger areas which can help the government enterprise make decisions to evacuate such areas. System 100 can provide construction enterprises with expected damages which help such enterprise to make decisions as to which buildings may have the greatest damage and are in need of emergency maintenance. System 100 can provide owners of buildings with a list of issues that need to be addressed as part of a proactive maintenance that should be performed ahead of schedule or at a later time given internal and/or external factors that affect building wear and tear, as well as provide information to potential buyers about the state of a building.

System 100 can provide regulators with a list of buildings which are compliant with building codes. System 100 can provide regulators with a list of buildings that have outstanding maintenance issues. System 100 can provide regulators with tracking remediation activities. System 100 can provide authorities with real time compliance insight on regulatory change implications.

Data repository 108 can store various data. Data repository 108 in buildings area 2121 can store data on buildings being service by system 100. From time to time, an owner of building, e.g. an individual owner or enterprise owner, or other interested stakeholder member (e.g. lender) with rights in respect to a building who has registered with authority 110 may wish to register a building for services managed by authority 110. In response to receipt of registration request, authority 110 can return data from geoclassification system 172 respecting parameters of a building for storage into buildings area 2121, e.g. geographical coordinate ranges for the building, construction details for the building, use classifications for the building, and the like.

System 100 can be configured according to one embodiment so that in response to registration of a building with authority 110, authority 110 automatically generates a genesis block defining a blockchain which block can accommodate growth by the addition of subsequent blocks authored by members of blockchain network having members of a variety of different classifications. System 100 can be configured so that authority 110 manages a discrete blockchain for each building registered in buildings area 2121. Accordingly, data repository 108 can store in buildings area 2121 identifying and descriptive and descriptive data for each blockchain associated to each building identified within buildings area 2121.

Also, in buildings area 2121 of data repository 108 there can be stored maintenance schedule data specifying a schedule for maintenance of components of each building registered with authority 110. Also, in buildings area 2121 of data repository 108 there can be stored inspection schedule data specifying a schedule for inspection of components of each building registered with authority 110. Embodiments herein recognize that various components of a building can be subject to routine maintenance according to a baseline schedule established based on, e.g. manufacturer or standard trade ratings associated with various building components. Embodiments herein can feature intelligent updating of such a building component maintenance schedule with use of features of a blockchain associated to a building.

Data repository 108 in construction stage specification area 2122 can store data on requirements, procedures, regulations, and/or guidelines associated with construction stages. For example, a construction stage involving construction of (a) foundation, (b) framing, or (c) finishing of a building. Data repository 108 in construction stage specification area 2122 can store construction stage specification data which can be accessed for later use by authority 110, e.g. for determining a quality rating associated to a construction stage.

Data repository 108 in component specification area 2123 can store data regarding expected per specification sensor measurements indicative of a level of degradation of a building component, e.g. a foundation structural component, a framing structural component, and/or a finishing structural component. Authority 110 can store component specification data in component specification area 2123 and can reference the data for later use, e.g. for determining the quality rating for a component part. For example, if a component is subject measurement with a moisture detector, the specification area can store data indicating expected moisture measurements for the component if functioning properly. For example, if a component is subject to measurement with a strain detector, the component specification area 2123 can store data indicating expected strain measurements for the component if functioning properly. For example, if a component is subject to measurement with a crack detection detector (e.g. provided by a camera associated to crack detection software), the component specification area 2123 can store data indicating expected crack dimensions for the component if functioning properly.

Data repository 108 in inspection specification area 2124 can store data on processes for performing inspections of buildings. Authority 110 can iteratively update inspection specification area 2124 via data queries to one or more government enterprise system of enterprise systems 140A-140Z. Government enterprise system of enterprise systems 140A-140Z can store updated data of building code inspection processes. Authority 110 can be configured to iteratively query such enterprise systems for data on updated inspection processes for storage into inspection specification area 2124.

Authority 110 in decision data structures area 2126 can store decision data structures for return of action decisions by authority 110. Decision data structures of decision data structures area 2126 can include, e.g. predictive models trained by machine learning, decision tables, and/or decision trees.

Authority 110 running preparation and maintenance process 111 can receive data from various data sources and can process from various data sources, such as client computer devices 130A-130Z, enterprise systems 140A-140Z, IoT sensor system 150, weather system 170, geoclassification system 172, and social media system 174, such data for storage records into various areas of data repository 108 such as areas 2121-2125.

Authority 110 running natural language processing (NLP) process 112 can process data for preparation of records that are stored in data repository 108 and for other purposes. Authority 110 can run a NLP process 112 for determining one or more NLP output parameter of received message or queried data source. NLP process 112 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 112 authority 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Authority 110 running ratings decision process 113 can determine one or more quality rating for construction stage transaction data for a building component, one or more quality rating for sensed condition transaction data for a component, and/or one or more quality rating for inspection stage transaction data for a component. Authority 110 according to one embodiment can make ratings decision process 113 and supporting data e.g. reference data of areas 2122-2124 available for private use by members of system 100 e.g. for structuring transaction data for presentment in a candidate blockchain block.

The quality rating for construction stage transaction data can include a performance rating indicating the degree to which a performed construction stage followed a specified procedure for the construction stage and also can include a structural integrity rating as to the strength quality of the component part constructed.

The quality rating for sensed condition transaction data can include a performance rating indicating the functioning quality of a sensor sensing a component and can include a structural integrity rating as to the strength of the component part sensed.

The quality rating for inspection transaction data can include a performance rating indicating the degree to which a performed inspection followed a specified procedure for the inspection and also can include an inspection pass/fail rating and a structural integrity rating as to the strength quality of the inspected component based on the inspection. For example, the structural integrity rating of the component part inspected can be higher in the case that the component passed inspection and lower in the case that the component failed inspection.

Authority 110 for performing rating decision process 113 can reference respective data of construction stage specification area 2122, where construction stage quality rating data is returned, can reference data of component specification area 2123 where sensed condition quality rating data is returned, and can reference data of inspection specification area 2124 in the case that inspection quality rating is returned.

Authority 110 running ratings decision process 113 can transform unstructured transaction data into structured form e.g. tagged with rating tags such as performance rating tags and/or structural integrity rating tags. Ratings decision process 113 can be run by authority 110 or sent to member nodes for installation and deployment by member nodes such as member nodes defined by enterprise system 140A-140Z and client computer devices 130A-130Z and IoT system 150.

Authority 110 can be configured so that transaction data defining a candidate block of a blockchain can be received in structured or unstructured form. Blocks added to a blockchain ledger 120 can be structured or unstructured. Where unstructured, authority 110 can read the unstructured data from ledger and process it using ratings decision process 113. Where structured, authority 110 can read structured data from blocks of ledger where the read structured data prior to adding of a block was structured using ratings decision process. Where ratings decision process 113 is not installed on member nodes, authority 110 may make running ratings decision process 113 available for private use by members so that members can structure their transaction data prior to presentment of a candidate block for inclusion in blockchain ledger 120 defining a blockchain ledger. According to some use cases, blocks of blockchain ledger 120 can include transaction data in unstructured form and authority 110 can run rating decision process 113 to structure the data.

Authority 110 running recording process 114 can include authority 110 determining whether a candidate block presented in a transaction pool will be added to an existing blockchain ledger 120 defining a blockchain ledger. Authority 110 running recording process 114 can include authority 110 examining a consensus condition to determine whether a consensus condition is satisfied. Authority 110 running recording process 114 can include authority 110 examining voting data from validators who are permissioned to validate a candidate block upon which, subsequent to validation, the candidate block can be added to a blockchain. Authority 110 can be configured so that in some embodiments express consensus is required in the form, e.g. of validating action by one or more member. Authority 110 running recording process 114 can dynamically adjust a consensus condition for adding a block to blockchain ledger 120 in dependence on a member classification of an author who has authored a candidate block for evaluation in a transaction pool. In some use cases consensus can be inferred. In some use cases, validation by one or more member of a current blockchain ledger may be required to validate a new block. In other use cases, validation by members who are authors of one or more blocks of a current blockchain ledger may be required for validation. In other use cases, validation by members who are authors of one or more blockchain ledger managed by authority 110 but who are not authors in a current blockchain may be sufficient for validation of a new candidate block for inclusion in blockchain ledger 120.

Authority 110 in members area 2125 can store data on members of system 100 who are members that have access rights to blockchain ledger 120. Authority 110 can assign different classifications to different members of system 100. Member classifications can include e.g. financial members, e.g. lender and insurance entities, building owner members, construction members, IoT members (who provide operate and maintain IoT system 150), inspector members, and other classification such as classification who have viewing (usage) rights in a blockchain ledger but not authoring rights. Individuals who are members of one of the classifications can be associated to an enterprise or may not be associated to an enterprise. Authority 110 can classify an individual user member as a code inspector user. A government enterprise can certify code inspectors and can store data on code inspector certifications within a government enterprise system of enterprise systems 140A-140Z. Authority 110 can query data of the relevant enterprise of enterprise systems 140A-140Z to verify that a user registering as a code inspector user is a certified code inspector certified by a government enterprise. Authority 110, according to one embodiment, can grant code inspector users of system 100 transaction recording and viewing access rights to blockchain ledger 120 and can assign users, other than code inspector users, more limited rights such as viewing rights only. According to some embodiments, authority 110 can reserve itself the right to author new blockchain blocks for inclusion in blockchain ledger 120.

Authority 110 can grant access rights to a member in response to a registration of the member as a member into authority 110. Authority 110 can differentiate rights between members based on their activities. For example, authority 110 may manage a plurality of instances of blockchain ledger 120 each for a different building. Authority 110 can increase access rights of a member in a second blockchain ledger in dependence on actions of the member in respect to a first blockchain ledger, for example can increase access rights in a second blockchain ledger in response to the member becoming a blockchain block author of the first ledger.

Authority 110 running recording process 114 can record blocks having building transaction data into blockchain ledger 120. Building transaction data can include e.g. financial transaction data, construction stage transaction data, sensed condition transaction data, and/or inspection transaction data. Authority 110 can perform recording process 114 in response to receipt of building event transaction data authored by a member.

Authority 110 running maintenance scheduling update process 115 can update maintenance schedules for one or more building being subject to management by system 100. Authority 110 running maintenance scheduling update process 115 can examine data of blockchain ledger 120 to determine a time of last maintenance of a building. Authority 110 for performing maintenance scheduling update process 115 can examine IoT sensor data received from one or more IoT sensor device disposed, e.g. fixed or moveable at a building and authority 110 can adjust a maintenance schedule in dependence on a level of degradation of a building as determined by received IoT sensor data subject to processing. For example, authority 110 can move maintenance date up where IoT sensor data indicates a high level of degradation or can push a maintenance date back where IoT sensor data indicates a low level of degradation. Authority 110 running maintenance scheduling update process 115 can in addition or alternatively query data of a predictive model that has been trained to predict a time of failure of a building component subject. Authority 110 running maintenance scheduling update process 115 can query a predictive model that has been trained by machine learning to predict when a building component will fail. Training data of training such a predictive model can include, e.g. failure data and weather data associated to historical like classified building components, e.g. like foundation components, like frame components, like finishing components or any other building components subject to scheduled maintenance. Embodiments herein recognize that updates to inspection schedules can accompany in all cases updates to a maintenance schedule. Accordingly, maintenance scheduling update process 115 can be alternately referred to as maintenance/inspection scheduling process 115.

Authority 110 running emergency response process 116 can provide one or more output in response to a detected weather emergency event. Authority 110 running emergency response process 116 can examine data of weather system 170 for indicators of a weather related emergency event, e.g. a hurricane or a tornado. In response to receipt of data indicating a weather-related emergency event, authority 110 can examine areas indicated by the weather data to be included in the weather event and can examine data of buildings area 2121 to identify buildings subject to management by system 100 within the affected area.

Authority 110 running emergency response process 116 can further query inspection compliance data of blockchain ledger 120 associated to each building identified within the affected weather event area. Authority 110 according to one embodiment, can rank identified buildings within the area according to building structural integrity. The ranking of buildings by structural integrity rating can be in dependence on building transaction data as determined by authority 110 by examination of blockchain ledger 120. Authority 110 running emergency response process 116 can send notification data and/or control data to various destinations in dependence on the returned ranking of buildings according to structural integrity rating. Authority 110 running emergency response process 116 can designate buildings having a structural integrity rating of above a threshold as "safe" buildings. Authority 110 running emergency response process 116 can send notifications to various destinations wherein the notifications specify the determined "safe" buildings. Users receiving the notifications can thereafter travel to the designated "safe" buildings for safety. Users receiving notifications can include users of system 100 who are members of a blockchain network managed by authority 110 and can include users who are non-members as well.

Authority 110 running machine learning process 117 can train predictive models by machine learning processes. Predictive models trained by machine learning processes such as supervised learning, machine learning processes can then be subject to query for return of predictive data.

Figure 2:
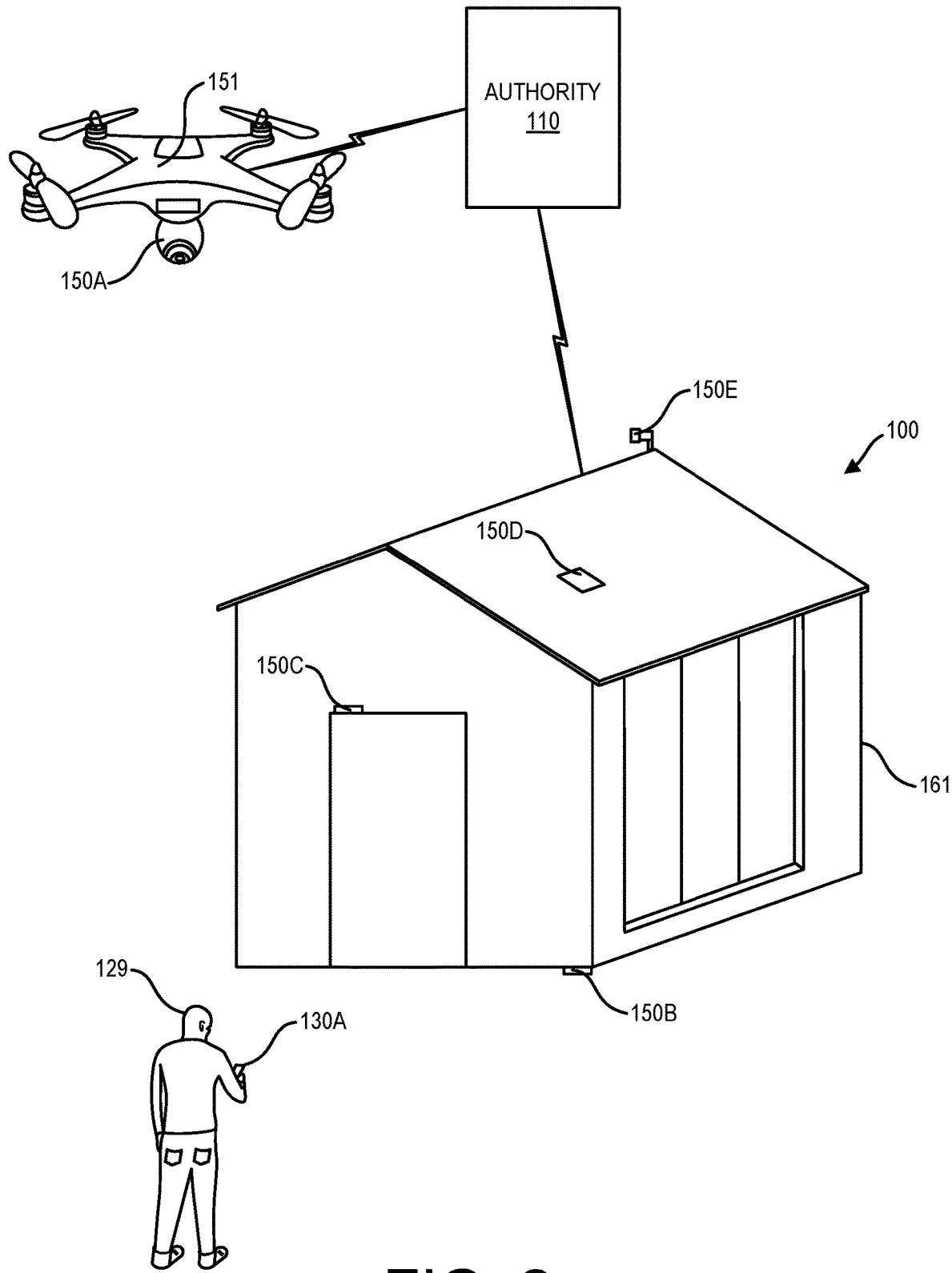
FIG. 2 is a physical schematic view of the system described in FIG. 1 according to one embodiment.

FIG. 2 is a perspective physical form view of system 100. FIG. 2 depicts a building 161 subject to inspection management services by system 100 and authority 110. Building 161 can have various associated IoT sensor devices for output of IoT sensor data that indicates a level of degradation of one or more building component. IoT sensor devices associated with building 161 can include IoT sensor devices 150A-150E as depicted in FIG. 2. IoT sensor device 150A can be an autonomous vehicle associated IoT device that is fixedly mounted to an autonomous vehicle 151 that can be moveably associated to building 161. It should be noted that an autonomous vehicle 151 can move so as to be associated to another building being subject to inspection management services by system 100. IoT sensor devices 150B-150E can be fixed to building 161. IoT sensor device 150B can be an IoT sensor device for sensing a level of degradation of a foundation, IoT sensor device 150C can be an IoT sensor device for sensing a level of degradation of a building entryway, IoT sensor device 150D can be an IoT sensor device for sensing a level of degradation of a roof, and IoT sensor device 150E can be an IoT sensor device for sending data indicative of a level of degradation of a roof, e.g. can be provided by a roof mounted camera. IoT sensor devices 150B-150E can be provided by, e.g. humidity sensors, pressure sensors, strain sensors, and the like. IoT sensor device 150A fixed to an autonomous vehicle 151 can be provided, e.g. by a camera sensor. Autonomous vehicle 151 can be e.g. ground based or air based. IoT sensor system 150 can have one or more sensor disposed to sense construction stage data of a building while it is being constructed. IoT sensor system 1450 can include a first sensors for sensing a construction of one or more building component while it is being constructed and a second sensors for sensing condition of one or more component in a static state after it is constructed. The second sensors may or may not include sensors of the second sensors.

Referring to FIG. 2, user 129 according to one scenario can be a member having a code inspector member classification. User 129 can complete an inspection of a component of building 161 and can author a report using client computer device 130A. User 129 can update blockchain ledger 120 to include the transaction record of a passed or failed building inspection define by the report. For transaction recording of blockchain ledger 120, user 129 can send a completed inspection report to authority 110 which can forward the report to blockchain ledger 120 for updating of blockchain ledger 120. In some scenarios, user 129 can elect to send building inspection data for processing by authority 110 for performing of a building inspection.

Figure 3A:
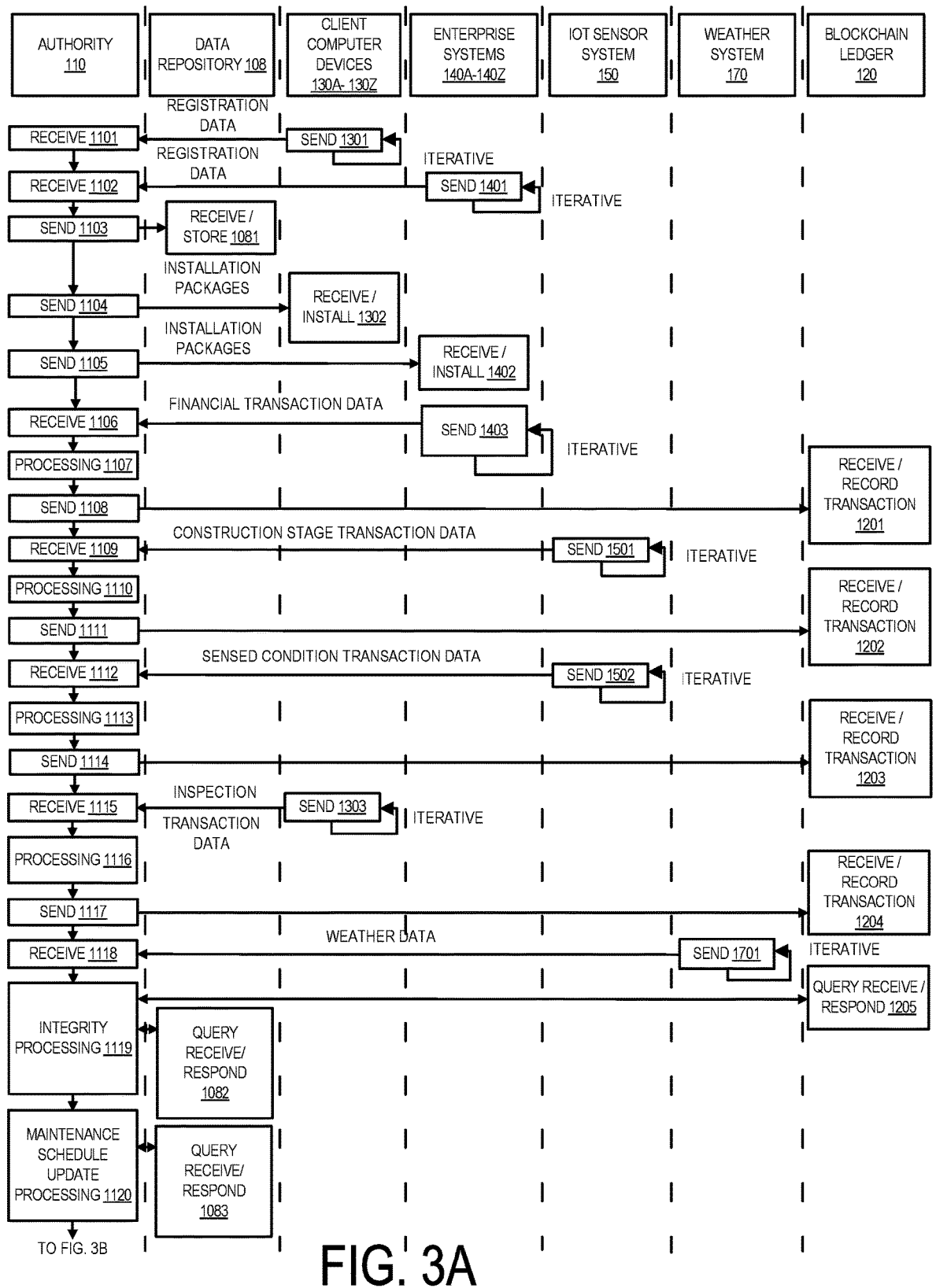
FIGS. 3A-3B is a flowchart depicting a method for performance by a system according to one embodiment.
Figure 3B:
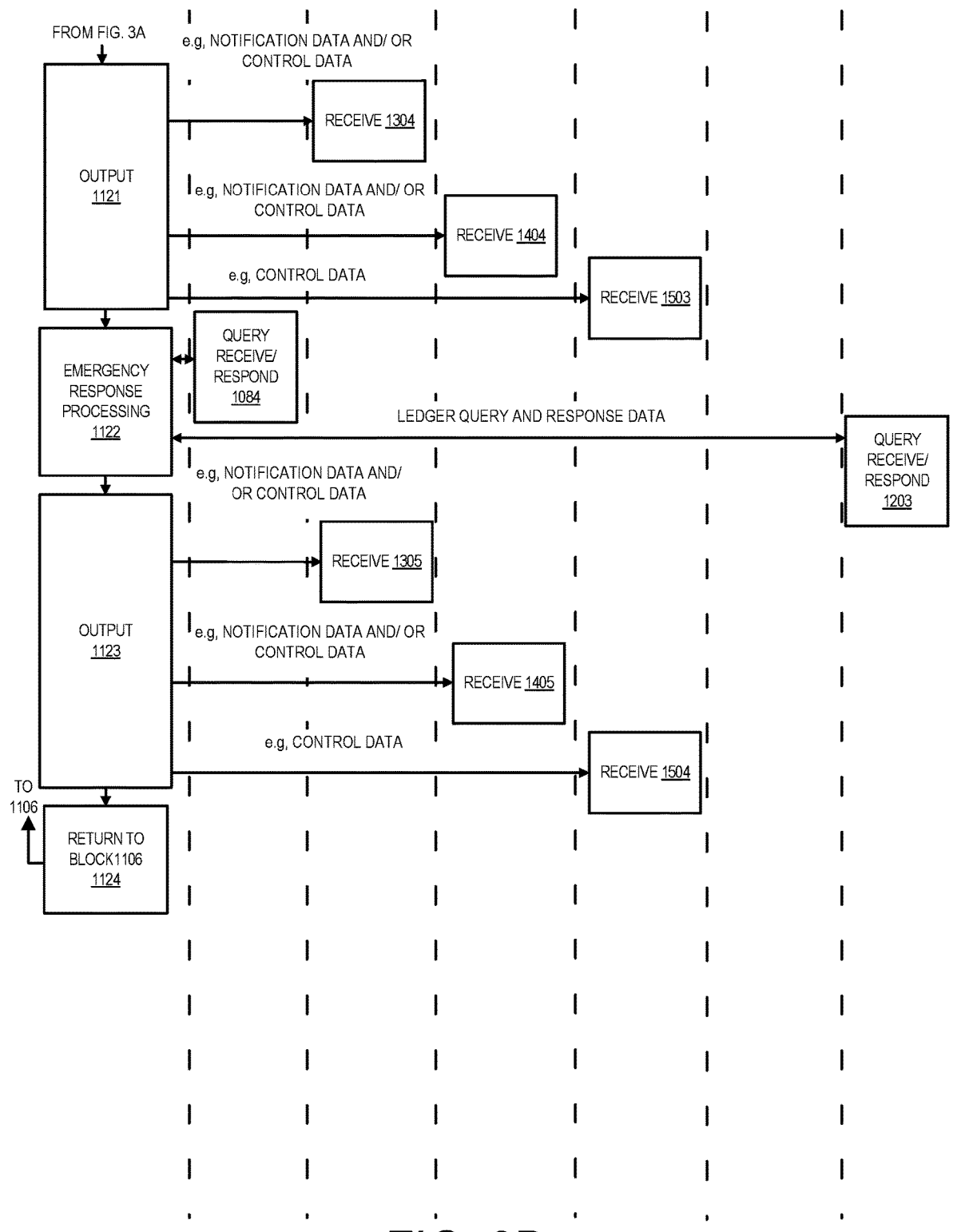
Figure 4A:
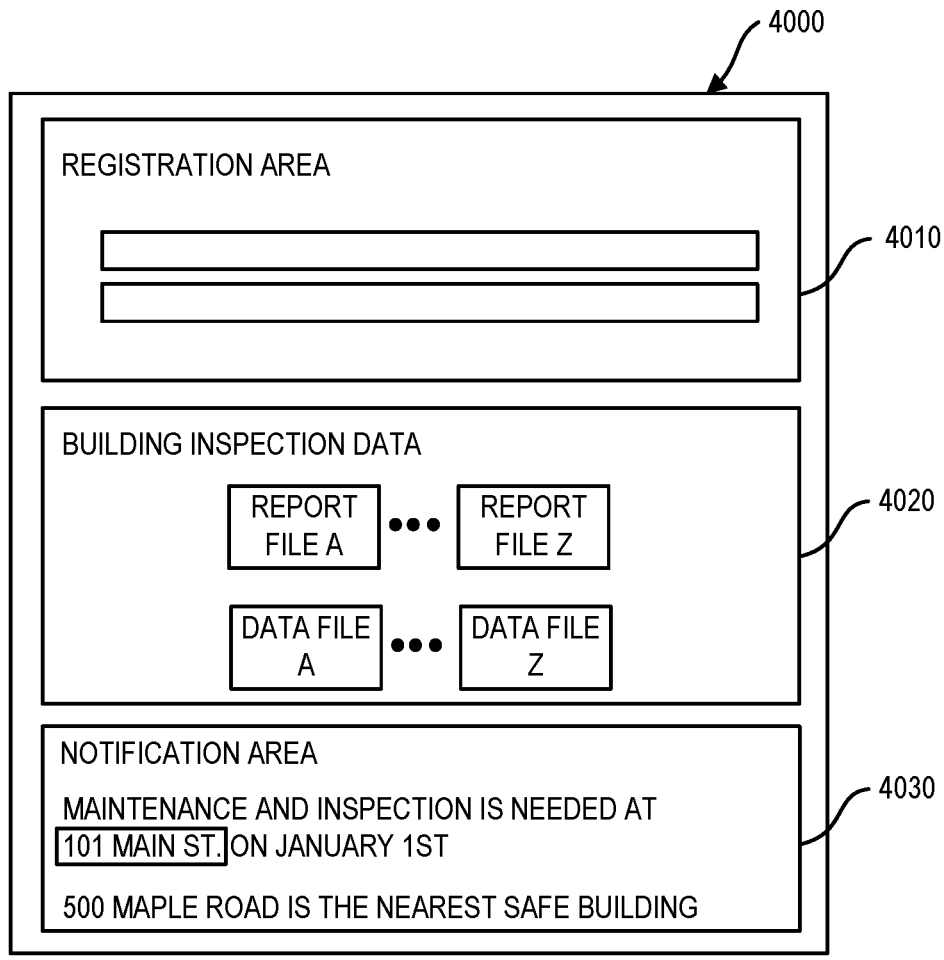
FIG. 4A depicts a user interface for display on a client computer device according to one embodiment.

FIGS. 3A-3B is a flowchart illustrating a method for performance by authority 110 interoperating with client computer devices 130A-130Z, enterprise systems 140A-140Z, IoT sensor system 150, weather system 170, and blockchain ledger 120. At block 1301 client computer devices 130A-130Z can be sending registration data for receipt by authority 110 at block 1101. A user of a client computer device of client computer devices 130A-130Z can define registration data with use of a user interface, such as a displayed user interface 4000 as depicted in FIG. 4A. Registration data can be entered using registration area 4010. Users registering can be associated to an enterprise operating an enterprise system or may be unaffiliated to any enterprise.

At block 1401 enterprise systems 140A-140Z can be sending registration data for receipt by authority 110 at block 1102. The registration data sent at block 1301 from client computer devices 130A-130Z and from enterprise systems 140A-140Z at block 1401 can be defined by a user using user interface 4000, which can be a displayed user interface displayed on a display of client computer devices 130A-130Z.

A user can enter registration data into registration area 4010 for registering a user as a member of system 100 and of a blockchain network associated to blockchain ledger 120. In some cases, client computer devices of client computer devices 130A-130Z can be administrator client computer devices associated with respective enterprise systems of enterprise systems 140A-140Z can enter registration data in registration area 4010. Registration data sent at blocks 1301 and 1401 can include such data as name, contact information, and requested classification, e.g. classification as a building owner member, financial member, construction member, IOT system member, or inspector member. Registration data can also include data that specifies whether the registering user is associated to an enterprise and can also specify whether the user is an individual owner of a building being subject to inspection management by system 100 or is associated to an enterprise that is an owner of a building being subject to inspection management by system 100. At block 1103 authority 110 can register individual users and enterprise representing users sending registered data as registered members of system 100. Registered members of system 100 can include individuals and enterprise members. Authority 110 at block 1103 for registering individual members and enterprise members as registered members can assign a universal unique identifier (UUID) for each new registered member. Authority 110 at block 1103 can send registration data for storage into data repository 108, e.g. for storage into members area 2125 of data repository 108. Authority 110 on completion of block 1103 can proceed to blocks 1104 and 1105.

At block 1104 authority 110 can send installation packages to client computer devices 130A-130Z for receipt by client computer devices 130A-130Z at block 1302. On receipt of the installation package, client computer devices 130A-130Z can install the received installation package. The installation package received and installed at block 1302 can include, e.g. libraries and executable code that facilitate client computer devices 130A-130Z functioning within system 100. At block 1105, authority 110 can send an installation package for receipt by enterprise systems 140A-140Z at block 1402. On receipt of the installation packages sent at block 1105, enterprise systems 140A-140Z can install the received installation packages. The received and installed installation packages can include, e.g. libraries and executable code that facilitate enterprise systems 140A-140Z functioning within system 100. On completion of block 1105, authority 110 can proceed to block 1106.

Referring to blocks 1106-1117, blocks 1106-1117 illustrate functions for adding blocks to blockchain ledger 120. According to system 100 blockchain blocks can include event transaction data in the form of, e.g. financial transaction data, construction stage transaction data, sensed condition transaction data, and inspection event transaction data. In response to receipt of registration data, e.g. at blocks 1101 and 1102 indicating that there is a new building for management by authority 110. Authority 110 can establish a genesis block for a new blockchain for the new building for recording of transaction data associated to the new building.

Figure 4B:
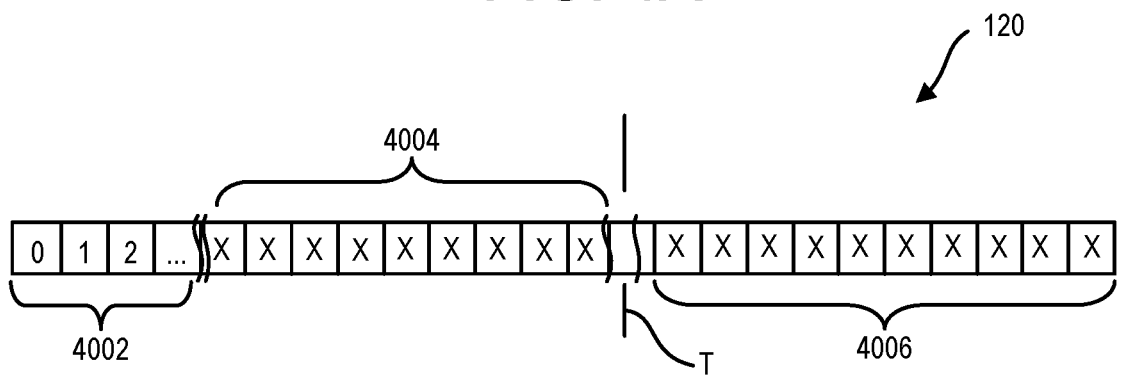
FIG. 4B depicts a blockchain ledger according to one embodiment.

A representative building blockchain ledger 120 defining a blockchain associated to a building is shown in FIG. 4B.

Initial blocks 4002 of blockchain ledger 120 can including the genesis block, i.e. block 0 can include blocks authored by financial institution owners, e.g. lender banks, insurance enterprises, and/or building owners. Early stage blocks 4004 as depicted in FIG. 4B can include a majority of blocks that are authored by a construction enterprise author. Early stage blocks as depicted in FIG. 4B map to times at which a building is being initially constructed. The time (T) as depicted in FIG. 4B depicts a time at which initial building construction of building is completed.

Post construction blocks 4006 depicted in FIG. 4A refer to blocks added to a blockchain ledger 120 subsequent to the time of initial construction and completion of a building. Post construction blocks 4006 can include blocks authored by a range of member classifications, e.g. by IoT system members who product sensed condition transaction data representing one or more component in a post construction state, inspector enterprise members, e.g. who may author new blocks when performing an inspection of the building, financial blocks authored by financial members, e.g. if ownership changes or is new insurance is purchased, or blocks authored by construction members, e.g. where routine maintenance is performed after a building is constructed or where there is a modification, e.g. a construction addition to the building.

Referring to the flowchart of FIGS. 3A-3B, authority 110 can iteratively perform blocks 1106-1117 to receive transaction data from a range of members of different membership classifications for processing received data and for adding new blocks to blockchain ledger 120 based on the processing.

At block 1106, authority 110 can receive financial transaction data from one or more enterprise of enterprise systems 140A-140Z, which one or more enterprise can be iteratively sending financial transaction data. In response to the receipt of the financial transaction data, authority 110 can proceed to block 1107. Referring to block 1403, enterprise systems sending financial transaction data can include blockchain header data so that the received financial data received at block 1106 is received as a candidate block for inclusion in blockchain ledger 120. The header data can include an identifier of the author member of the candidate block. Data repository 108 in members area 2125 can store member classification of members.

At block 1107, authority 110 can perform processing of the received financial transaction data. The processing at block 1107 can include processing to transform raw financial transaction data into structured financial transaction data for example and/or can include processing to qualify the received financial transaction data for inclusion in a new block of blockchain ledger 120.

According to one policy new blocks can be added to blockchain ledger 120 in response to consensus achieved. The consensus can be expressed, e.g. by voting of members or can be inferred. Validating members who are authorized to validate candidate blocks of a transaction pool according to one embodiment can be restricted to members who are authors of the current blockchain or can be members who have participated as authors of one or more block at least one blockchain of a plurality of blockchains being managed by authority 110 or can be members who have become members of a blockchain network by registering with authority 110 but who have not yet authored any block of any ledger associated to a building being managed by authority 110. A consensus decision process according to one embodiment is depicted in Table A. Table A as presented below specifies consensus rules that can be employed for adding blocks to blockchain ledger 120.

TABLE A

| Member Classification | Consensus Rule | Dynamic Adjustment |
| --- | --- | --- |
| Financial | Threshold percentage of owners must validate; financial members excluded as validators | Threshold changes inversely relative to reputation rating for financial member |
| Building Owner | Threshold percentage of financial members must validate; building owners excluded as validators | Threshold changes inversely relative to reputation rating for building owner member |
| IoT | Threshold percentage of IoT members must validate; construction members excluded as validators | Threshold changes inversely relative to reputation rating for IoT member |
| Construction | Threshold percentage of construction members must validate; IoT members excluded as validators | Threshold changes inversely relative to reputation rating for construction owner |
| Inspector | Threshold percentage of IoT members of must validate; inspector members excluded as validators | Threshold changes inversely relative to reputation rating for inspector member |

In general, as depicted in Table A, new candidate blocks for addition to a blockchain authored by a blockchain owner can be validated and added to a blockchain in response to a specified consensus condition being satisfied.

As depicted in Table A, candidate blocks added by a member of a blockchain network can be validated by way of voting of blockchain network members of different (i.e. nonpeer) members of a classification. For example, referring to Table A according to one embodiment, candidate blocks authored by building owners can be validated by financial members, candidate blocks authored by IoT members can be validated by construction members, candidate blocks authored by construction members can be validated by IoT members, candidate blocks authored by inspection members can be validated by IoT members, and candidate blocks authored by financial members can be validated by building owner members. Other rules may be applied.

According to one embodiment, members who are of the same classification of a candidate block of a transaction pool being processed for addition into a blockchain can be excluded as validators. Referring again to Table A, according to a general rule a threshold percentage of members of a specified classification may be required for validating a new candidate block so that the candidate block can be added to a blockchain. However, also as specified in Table A, the referred to threshold can be a dynamic threshold that can be dynamically adjusted over time. For example, according to one embodiment the various thresholds referred to in Table A can be dynamic thresholds that are dynamically adjusted over time in dependence on a member's reputation rating. For example, each member who is registered with authority 110 can have a reputation rating that can be tracked over time and recorded in members area 2125 of data repository 108.

Various actions can be tracked by authority 110 which may increase a member's reputation rating and various actions can be tracked by authority 110 that can decrease a member's reputation rating. Actions that can increase a member's reputation rating can include, e.g. being validated as an author in a new blockchain. For example, a member can be assigned points for each new ledger defined by a blockchain in which the member is an author and points can be assigned to an author for adding blocks to each new blockchain. Authority 110 can add points to a member's reputation rating by positive performance of the member, e.g. in authoring new blocks of any blockchain having a high quality rating such as in the case of a construction member who performs a construction change according to a specification or an inspector member that performs an inspection according to a specification. Third party systems can be queried for determination of whether to add or subtract points from a member's reputation rating. For example, in the case a financial enterprise member financial institution rating services can be queried. In the case of building owner, a credit rating service can be queried, and the building owner's reputation rating can be adjusted up or down in dependence on a credit rating. Authority 110 can subtract from a member's reputation rating in response to the identification of instances of negative performance, e.g. for a construction member in the performance of a construction stage that did not comply with requirements of a specification detail; for a construction member in the case a constructed component fails due to construction error; or in the case of an IoT system member where an IoT sensor of an IoT sensor system failed to produce accurate sensor data; or in the case of an inspector member where an inspection was identified as being performed improperly. Authority 110 can increase a reputation rating for a construction member or an inspector member for proper performance of a construction stage or inspection.

Referring again to Table A, authority 110 can be configured so that the referred to thresholds in the consensus rule column of Table A can be moved to 0, i.e. so that a candidate block is automatically added in response to a member request where a reputation of a member exceeds a threshold. However, at any time that member can experience a reduction in that member's reputation rating, e.g. attributable to poor performance which can result in new candidate blocks authored by that member requiring express validation by one or more member.

Referring again to Table A, authority 110 can be configured so that consensus condition for validation of candidate block as an additional block for inclusion in a blockchain are moderate, i.e. tending toward minimal restriction on the addition of new blocks. However, with reference to Table A, consensus rules can be enforced so that if a candidate block is not validated and added to a blockchain ledger 120, authority 110 can responsively send notifications to relevant members, e.g. having authorship status with respect to one or more blocks of the current blockchain. Notifications indicating that a candidate block has not been validated. Thus, members with interests in the building associated with the blockchain can take action, e.g. to engage a substitute member to take action to replace the action of the candidate block not validated. Safeguards can be employed so that where a member's reputation rating declines consensus requirements for validating new candidate blocks authored by the member increase. Thus, overall consensus rules can be enforced to encourage members to maintain high reputation ratings.

In response to a consensus condition being achieved at block 1107, authority 110 can proceed to block 1108. At block 1108, authority 110 can send communication data so that the candidate block evaluated at processing block 1107 is added to blockchain ledger 120. At block 1201, blockchain ledger 120 at "A" records the newly validated candidate block as a new block of blockchain ledger 120. Contemporaneously, different member nodes can store all or part of the blockchain of blockchain ledger 120 which can be provided by a blockchain ledger. In response to completion of block 1108 authority 110 can process to block 1109.

At block 1109, authority 110 can be receiving construction stage transaction data from IoT sensor system 150 which can be iteratively sending construction stage transaction data. With construction stage transaction data sent at block 1501, there can be sent blockchain header data so that the received data received at block 1109 is received as a candidate blockchain data. The header data can include an identifier of the author member of the candidate block. Data repository 108 in members area 2125 can store member classifications of members mapped to identifiers for the members so that authority can determine a classification for member by lookup using members area 2125.

At block 1109 authority 110 can be receiving construction stage transaction data in unstructured or structured form (e.g. structured having embedded quality ratings data as set forth herein as determined with use of rating decision process 113 running on authority 110 or locally on a member node). At block 1109 authority 110 can be receiving construction stage transaction data in unstructured or structured form together with blockchain block header data so that the received transaction data can be subject to transaction pool processing as a candidate block for addition to blockchain ledger 120. The quality rating for construction stage transaction data can include a performance rating indicating the degree to which a performed construction stage followed a specified procedure for the construction stage and also can include a structural integrity rating as to the strength quality of the component part constructed.

In response to receipt of construction stage transaction data at block 1109, authority 110 can proceed to block 1110. Construction stage transaction data sent at block 1501 can be sent by IoT devices of IoT system 150 configured for sensing operations performed during a construction stage (including maintenance stage). IoT sensor devices 150A-150E (FIG. 2) can be provided by, e.g. humidity sensors, pressure sensors, strain sensors, and the like. IoT sensor device 150A fixed to an autonomous vehicle 151 can be provided, e.g. by a camera sensor. Autonomous vehicle 151 can be e.g. ground based or air based. IoT sensor system 150 can provide sensor data representing an attribute of a construction stage of a building component. IoT devices of IoT sensor system 150 can be computing node based devices having location sensing capabilities, e.g. can include GPS sensors, so that received construction stage transaction data and/or blockchain header data accompanying the construction stage transaction data can be timestamped and geostamped to indicate a time and location of the IoT device defining a data source when the construction stage transaction stage is sent by an IoT device and received by authority 110.

At block 1110, authority 110 can perform processing the received construction stage transaction data. The processing at block 1110 can include processing to transform raw construction stage transaction data into structured construction stage transaction data, e.g. specifying a quality rating of performance of a construction stage, and/or the quality rating of a constructed component. Received construction stage transaction data can alternatively include structured data having quality ratings data.

The processing at block 1110 can include processing for validating the candidate blockchain data for inclusion as blockchain data. Consensus condition processing as described in reference to Table A can be performed at block 1110. In response to the candidate blockchain data being validated, authority 110 can proceed to block 1111 to send communication data to blockchain ledger 120 at "A" so that a new block, e.g. which can be coauthored by a construction member and an IoT sensor member is added to blockchain ledger 120 by blockchain ledger 120 at block 1202. In response to completion of block 1111, authority 110 can proceed to block 1112.

At block 1112, authority 110 can be receiving sensed condition transaction data from IoT sensor system 150 sent at block 1502. The IoT sensor system data of block 1502 can be accompanied by block header data so that the received data received at block 1112 is received as a candidate block of a blockchain. The header data can include an identifier of the author member of the candidate block. Data repository 108 in members area 2125 can store member classifications of members mapped to identifiers for the members so that authority can determine a classification for member by lookup using members area 2125.

In the response to the receipt of data at block 1112 authority 110 can proceed to block 1113. Sensed condition transaction data sent at block 1502 can be sent by IoT devices of IoT system 150 configured for sensing conditions of a component that has been constructed (including maintenance stage). An IoT device of IoT system 150 can send sensed condition transaction data over the lifetime of a component, e.g. daily, weekly, monthly etc. IoT sensor devices 150A-150E (FIG. 2) can be provided by, e.g. humidity sensors, pressure sensors, strain sensors, and the like. IoT sensor device 150A fixed to an autonomous vehicle 151 can be provided, e.g. by a camera sensor. Autonomous vehicle 151 can be e.g. ground based or air based. IoT sensor system 150 can provide sensor data indicative of a level of degradation of a building component. IoT devices of IoT sensor system 150 can be computing node based devices having location sensing capabilities, e.g. can include GPS sensors, so that received sensed condition transaction data and/or blockchain header data accompanying the sensed condition transaction data can be timestamped and geostamped to indicate a time and location of the IoT device defining a data source when the sensed condition transaction data is sent by an IoT device at block 1502 and received by authority 110 at block 1112.

At block 1113, authority 110 can process raw sensed condition transaction data to return structure sensed condition transaction data, e.g. which includes returned quality rating parameters as set forth herein. Received sensed condition transaction data can alternatively include structured data having quality ratings data. Processing at block 1113 can include transaction pool candidate processing so that the data defining a candidate blockchain block received at block 1112 is validated by application of consensus rules as set forth in connection with Table A. In response to the candidate blockchain block being validated, authority 110 can proceed to block 1114.

At block 1114, authority 110 can send a communication to blockchain ledger 120 at "A" so that the candidate blockchain block is added to blockchain ledger 120 by blockchain ledger 120 at block 1203. In response to completion of block 1114 authority 110 can proceed to block 1115.

At block 1115, authority 110 can be receiving inspection transaction data sent by a client computer device of an inspector member at block 1303. The inspection transaction data sent at block 1303 can be accompanied by blockchain header data so that the data received at block 1115 is received as a candidate blockchain block. The header data can include an identifier of the author member of the candidate block. Data repository 108 in members area 2125 can store member classifications of members mapped to identifiers for the members so that authority can determine a classification for member by lookup using members area 2125.

Processing at block 1116 can include processing to transform received raw inspection transaction data into structured inspection transaction data, e.g. specifying quality ratings associated with an inspection as set forth herein. Received construction stage transaction data can alternatively include structured data having quality ratings data. Inspection transaction data sent at block 1303 can be sent by a client computer devices of client computer devices 130A-130C. Client computer devices can send inspection transaction data over the lifetime of a component, e.g. according to a code inspection schedule Client computer devices 130A-130Z can be computing node based devices e.g. mobile hand held computing devices having location sensing capabilities, e.g. can include GPS sensors, so that received inspection transaction data and/or blockchain header data accompanying the inspection stage transaction data can be timestamped and geostamped to indicate a time and location of a client computer device (associated to an inspector member user) defining a data source when the inspection data is sent by client computer device at block 1303 and received by authority 110 at block 1115.

Processing at block 1116 can also include transaction pool candidate block processing so that the received data defining a candidate blockchain block received at block 1115 is subject to consensus rule processing to validate the block as a new block of blockchain ledger 120. In response to a consensus condition being achieved at block 1116, authority 110 at block 1117 can send a communication to blockchain ledger 120 to add the new candidate block as a block of blockchain ledger 120. In response to completion of block 1117 authority 110 can proceed to block 1118.

Construction stages contemplated herein include brick and mortar or cement-concrete type of construction stages, such as construction of buildings, and other construction stages such as framing stages and finishing (e.g. roofing and siding) construction stages. The longevity of any building component constructed as a construction work product depends on a large number of factors, e.g., how the quality of materials is maintained and measured during the construction project, the types and quantities of ingredients or proportions of the ingredients are used while constructing the item. IoT sensor system 150 can be configured to provide sensor data indicating e.g. quality of materials, quantities measured during the construction project, types and quantities of ingredients or proportions of the ingredients are used while constructing the item Embodiments herein recognize that improper mixing of the ingredients might result in poor quality of construction work product. For example, in constructing a building, the proportion of cement and sand is an important factor in determining the suitability of a construction item, such as of a column upon which the bridge rests. Improper mixing of the ingredients might cause defects in a building component.

Similarly, the sequence of operations employed in a construction of a building component is another important factor. For example, while building a concrete pillar, the watering or curing time is very important. As an example, a poured concrete pillar might have to cure, with additional water applied, for a duration of x days to prevent internal cracks in the pillar. Embodiments herein recognize that many construction projects suffer from minor issues to catastrophic failures due to mismanagement of the factors affecting the project.

During the construction project, operations that are being performed ideally comply with industry practices, project requirements, design specifications, and many other controls.

IoT sensor system 150 can be configured to provide sensor data indicating actions being performed during construction stage. According to one embodiment, rating decision process 113 can be active to generate rating quality data based on the sensor data. For example, if a cement mixer is turning with greater than a certain weight, a cognitive analysis by process 113 of the various data items enables the embodiment to draw an inference with a greater than a threshold confidence that a concrete mixing operation is underway. Reference data stored in construction stage specification area 2122 (which like process 113 can be made available for private use by a member) can be utilized. Similarly, data items indicating checking out a quantity of cement prior to the mixing, the mixing, and the positioning of a concrete pump at a location in some sequence can indicate a concrete pouring sequence of operations. Each operation in a sequence computed with associated confidence in this manner is stored in a block in the blockchain as well.

An embodiment uses the contents of reference data from construction stage specification area 2122 the contents of the operations blocks, and the contents of the data item blocks in cognitive analysis for decision-making. A non-limiting example of the types of decisions made by the cognitive analysis by ratings decision process 113 includes, determining whether a weight or measurement of cement mixed with a weight or measurement of water complies with a cement-water ratio specified in construction stage specification area 2122. One or more data item blocks provide the measurement of cement, one or more data item blocks provide the measurement of water, and one or more data items from construction stage specification area 2122 provide the specified ratio.

For example, a weight sensing IoT device in the mixer provides the weight data item of solids added to the mixer, a camera IoT sensor image data item verifies that the solids being added is cement, a flow data item from a flow meter IoT device verifies a volume of water flowing into the mixer. A location data item from an image or a location sensing device of the mixer identifies an intended use of the mix at the location. A reference item from a construction drawing from construction stage specification area 2122 identifies the construction item at or proximate to the location for which the mix is intended. An engineering specification stored in construction stage specification area 2122 corresponding to the construction item provides a requisite ratio.

If the mix deviates more than a tolerance value from reference data of data repository stored in construction stage specification area 2122 under the circumstances in real-time at the time the data items are collected, the decision-making component of the embodiment generates an exception notification and creates a block containing exception data for the blockchain and a lower rated construction member performance rating, and a corresponding lower structural integrity rating for a component. If the mix is compliant a higher rated construction member performance rating can be generated, and a corresponding lower structural integrity rating for a component.

Similarly, if the mixing has been performed, and the mixer is stopped with the pump truck connected, an embodiment forecasts a future operation using forecasting defined by a reference item of area 2122. For example, the future operation in a known sequence following the mixing, stopping the mixing, and connecting the pump truck would be to pour the concrete into a cast. Accordingly, the embodiment determines that the next operation would be the pouring. A deviation from the forecasted operation can result in the generation of a lower rated construction member performance rating, and a corresponding lower structural integrity rating for a component. If the forecasted operation is performed a higher rated construction member performance rating can be generated, and a corresponding lower structural integrity rating for a component.

As another example, suppose that the embodiment determines that the mixing duration in the sequence is less than a specified duration, but mixing has stopped, and the pump truck is being connected according to the data items being generated by various sensors and devices. The deviation can result in the generation of a lower rated construction member performance rating, and a corresponding lower structural integrity rating for a component. If the mixing duration is compliant as may be determined by reference to data of construction stage specification area 2122 a higher rated construction member performance rating can be generated, and a corresponding higher structural integrity rating for a component.

Some collected data may require pre-processing for data item extraction. For example, if a data item is an image or a video, image analysis can be used to extract image features, such as construction items, types of operations being performed, materials being used, and many other image features that will be conceivable from this disclosure by those of ordinary skill in the art. System 100 may further use cognitive analysis to distinguish between possible construction items, types of operations being performed, materials being used, and many other image features which may be subject to multiple interpretations, or for which multiple instances may be possible at the construction site. For example, if the image analysis reveals a construction component that is a pillar, the cognitive analysis may analyze the construction drawing, a phase of construction during which the pillar is being constructed, a location at which the pillar is being constructed and may determine that the pillar is pillar ABC 123 in the construction drawing as may be referenced in reference data of construction stage specification area 2122 and/or buildings area 2121.

At block 1112 authority 110 can be receiving sensed condition transaction data in unstructured or structured form (e.g. structured form characterized by having embedded quality ratings data as set forth herein as determined with use of rating decision process 113 running on authority 110 or locally on a member node). At block 1112 authority 110 can be receiving construction stage transaction data in unstructured or structured form together with blockchain block header data so that the received transaction data can be subject to transaction pool processing as a candidate block for addition to blockchain ledger 120. The quality rating for sensed condition transaction data can include a performance rating indicating the functioning quality of a sensor sensing a component and can include a structural integrity rating as to the strength of the component part sensed.

IoT sensor devices 150B-150E as shown in FIG. 1 can be fixed to building 161 for sensing conditions of components of buildings after the components have been constructed. IoT sensor device 150B can be an IoT sensor device for sensing a level of degradation of a foundation, IoT sensor device 150C can be an IoT sensor device for sensing a level of degradation of a building entryway, IoT sensor device 150D can be an IoT sensor device for sensing a level of degradation of a roof, and IoT sensor device 150E can be an IoT sensor device for sending data indicative of a level of degradation of a roof, e.g. can be provided by a roof mounted camera. IoT sensor devices 150B-150E can be provided by, e.g. humidity sensors, pressure sensors, strain sensors, and the like. IoT sensor device 150A fixed to an autonomous vehicle 151 can be provided, e.g. by a camera sensor. Autonomous vehicle 151 can be e.g. ground based or air based. IoT sensor system 150 can provide sensor data indicative of a level of degradation of a building component.

IoT sensor system 150 at block 1502 can iteratively send sensed condition transaction data for receipt by authority 110 at block 1112. IoT sensor system 150 can include a plurality of discrete IoT sensor devices distributed throughout a building according to the exemplary general scheme as depicted in FIG. 2, wherein some IoT sensor devices can be fixed devices fixed to a building and some IoT sensor devices can be autonomous vehicle associated moveable IoT devices.

IoT devices can output IoT sensor data indicative of a level of degradation of a building component. IoT sensor system 150 at block 1502 based on the IoT sensor data can iteratively send sensed condition transaction data for receipt by authority 110 at block 1112.

Ratings decision process 113 can be run to structure unstructured sensor data. The quality rating for sensed condition transaction data can include a performance rating indicating the functioning quality of a sensor sensing a component and can include a structural integrity rating as to the strength of the component part sensed. Running rating decision process 113 it can be determined that a sensor is producing erroneous data indicating that a sensor is malfunctioning and a rating indicating a negative performance rating can be associated to an IOT sensor system member. Running rating decision process 113, sensor data can be examined using reference data from component specification area 2123 to determine a level of degradation of a component and structural integrity rating data can be returned accordingly. A member can use an instance of ratings decision process 113 made available for private use by the member or alternatively, a member node can have installed thereon an instance of ratings decision process 113 with supporting reference data.

At block 1115 authority 110 can be receiving inspection transaction data in unstructured or structured form (e.g. structured form characterized by having embedded quality ratings data as set forth herein as determined with use of rating decision process 113 running on authority 110 or locally on a member node). At block 1115 authority 110 can be receiving inspection transaction data in unstructured or structured form together with blockchain block header data so that the received transaction data can be subject to transaction pool processing as a candidate block for addition to blockchain ledger 120. The quality rating for inspection transaction data can include a performance rating indicating the degree to which a performed inspection followed a specified procedure for the inspection and also can include an inspection pass/fail rating a structural integrity rating as to the strength quality of the inspected component based on the inspection. For example, the structural integrity of the component part inspected can be higher in the case that the component passed inspection and lower in the case that the component failed inspection.

At block 1303 client computer devices 130A-130Z can be iteratively sending building inspection data for receipt by authority 110 at block 1115. Building inspection data sent at block 1303 can include, e.g. a report file or an unstructured data file. A report file can be a completed building inspection report authored by a certified code building inspector. An unstructured data file can include data representing a building, e.g. video data representing a building that can be sent to authority 110 for processing by rating decision process 113 of authority 110 for determining whether a building has passed or failed a building inspection. Alternatively, a member node can use an instance of rating decision process 113 made available for private use by the member node or an instance of rating decision process 113 with supporting reference data can be run on the member node. Processing of an unstructured data file, e.g. a video data file can include authority 110 performing automated data processing such as video data processing to determine based on reference data stored in inspection specification area 2124 whether a building component has passed or failed an inspection.

Users of a client computer device of client computer devices 130A-130Z, can define building inspection data using building inspection data area 4020 of user interface 4000 as depicted in FIG. 4B in the case that user interface 4000 is customized for an inspector member. A user using area 4020 can select from report files or unstructured data files to send to authority 110 for receipt by authority 110 at block 1115 and processing by authority 110 at block 1116.

Transaction data sent at blocks 1403, 1501, 1502, 1303 can include identifying data identifying a relevant building and component. In some cases the transaction data can include UUIDs specifying a building and component respectively. In some cases, identifying data for a building and a component can include location data, e.g. GPS data which can be output by a sensor of IOT sensor system or of a client computer device. Buildings area 2121 can include mapping data that maps locations of buildings and components to identifiers. Thus, authority is able to determine an identifier for any building or component from received location data that can be included within received transaction data.

On completion of block 1117, authority 110 can proceed to block 1118, wherein authority 110 can receive data from weather system 170 which can be iteratively sending weather data at block 1701. At block 1118, authority 110 can be receiving weather data. Received weather data received at block 1118 can be stored in data repository 108. In response to completion of block 1118 authority 110 can proceed to block 1119.

At block 1119, authority 110 can perform integrity determination processing to generate a structural integrity rating for respective components of building. Authority 110 performing block 1119 can include authority 110 activating integrity determination process 115. Authority 110 at block 1119 can be iteratively performing integrity determination processing for every building being managed by authority 110 having an associated blockchain ledger 120 so that at any time, authority 110 has available e.g. stored in buildings area 2121 and up to data structural integrity array specifying a current structural integrity rating for each component of any building being managed by authority 110. As set forth herein, the feature providing network access can provide various advantages including quick response time in emergency situations.

Integrity processing at block 1119 can include iterative queries of data repository 108 and ledger 120 as indicated by query receive and respond blocks 1082 and 1205 performed respectively by data repository 108 and ledger 120. Authority 110 performing integrity processing block 1119 can include authority 110 applying the formula of Eq. 1 as set forth herein below.

$$P = F_1 W_1 + F_2 W_2 + F_3 W_3 + F_4 W_4 + F_5 W_5 \quad \text{(Eq. 1)}$$

Where P is the structural integrity rating for the component, where $F_1$-$F_5$ are factors contributing the structural integrity rating and where $W_1$-$W_5$ are weights associated with the various factors.

Referring to Eq. 1, $F_1$ can be a structural integrity rating attributable to the construction stage data for the component, $F_2$ can be a structural integrity rating attributable to sensed condition data for the building component, $F_3$ can be a structural integrity rating attributable to the inspection data for the component, $F_4$ can be a member reputation rating for the component, and $F_5$ can be a weather degradation factor for the component.

The factor $F_1$ data can be determined by examination of blockchain block transaction data authored by construction members, the factor $F_2$ data can be determined by examination of blockchain block transaction data authored by IoT sensor members, the factor $F_3$ data can be determined by examining blockchain transaction data blocks authored by inspector members. For assigning a structural integrity rating for a component under factor F1, authority 110 can read structural integrity ratings included within construction stage transaction data of one or more construction member authored blockchain block or if the construction stage transaction data is unstructured can run process 113 to return the structural integrity ratings for construction stage transaction data. For assigning a structural integrity rating for a component under factor F2, authority 110 can read a structural integrity rating included within latest timestamped sensed condition transaction data of an IOT system member authored blockchain block or if the sensed condition transaction data is unstructured can run process 113 to return the structural integrity rating. For assigning a structural integrity rating for a component under factor F3, authority 110 can read a structural integrity rating included within latest timestamped inspection transaction data of an inspector member authored blockchain block or if the sensed condition transaction data is unstructured can run process 113 to return the structural integrity rating.

The reputation rating for a component according to factor $F_4$ can be based on an examination of reputation ratings for all members for determination of a reputation rating associated to a current component being subject to structural integrity scoring.

Authority 110 can identify each block of blockchain ledger 120 associated to a component and can ascertain the current reputation rating for the member or members who authored the specific block and can accumulate the ratings which can be scaled, e.g. to account for a number of transactions and components per block, the criticality of the component, etc. In arriving at the reputation rating for factor $F_4$ authority 110 can count blocks that have no component specific association but are building wide specific, e.g. can count financial transaction related blocks in the determination of a reputation rating for the component. Authority 110 can apply a higher rating under factor $F_4$ where the blocks associated to a component have higher reputation ratings and can assign lower ratings under factor $F_4$ where blockchain blocks associated to a component have lower associated reputation ratings.

For assigning a structural integrity rating under factor F4 (reputation) authority 110 can apply Eq. 2 below.

$$S = (\Sigma_{i=1}^{n} Ri Wi)/n \quad \text{(Eq. 2)}$$

Where S is the reputation based structural integrity rating for a certain component under factor F4, where, i to n are the specific blocks of blockchain ledger 120 associated to the certain component, wherein Ri is the current reputation rating for the author of the block (aggregated, e.g. averaged if there are multiple authors), and Wi is a weight based on the membership classification of the author. In the referenced example a single transaction and single component blockchain block is assumed. Authority 110 can use the weights as indicated in Table B in calculating reputation based structural integrity rating for a certain component under factor F4 using Eq. 2.

TABLE B

| Member Classification | Weight |
|---|---|
| Financial | 1 |
| Building Owner | 2 |
| IoT | 4 |
| Construction | 5 |
| Inspector | 3 |

Accordingly, it will be seen that a component's (and therefore a building's) structural integrity rating can depend on a wide variety of actions. The action of certain bank member approving a loan involving a second building and adding transaction data specifying the loan in a second blockchain ledger, thereby initially achieve author status in the second blockchain ledger can increase the reputation rating of the bank member within the blockchain network being managed by authority 110. The increased reputation rating of the certain bank member can increase the structural integrity rating of a component of a first building associated to the first blockchain ledger, where the certain bank member is an author of one or more block of the first ledger. Accordingly, a structural integrity rating of a component can be advantageously impacted with use of crowdsourced feedback data, wherein numerous and diverse perspectives and actions are processes for improved accuracy. As set forth herein e.g. in reference to Eq. 3 a building's structural integrity rating can be in dependence on building component ratings. Accordingly, a structural integrity rating of a building can be advantageously impacted with use of crowdsourced feedback data, wherein numerous and diverse perspectives and actions are processes for improved accuracy.

Figure 5:
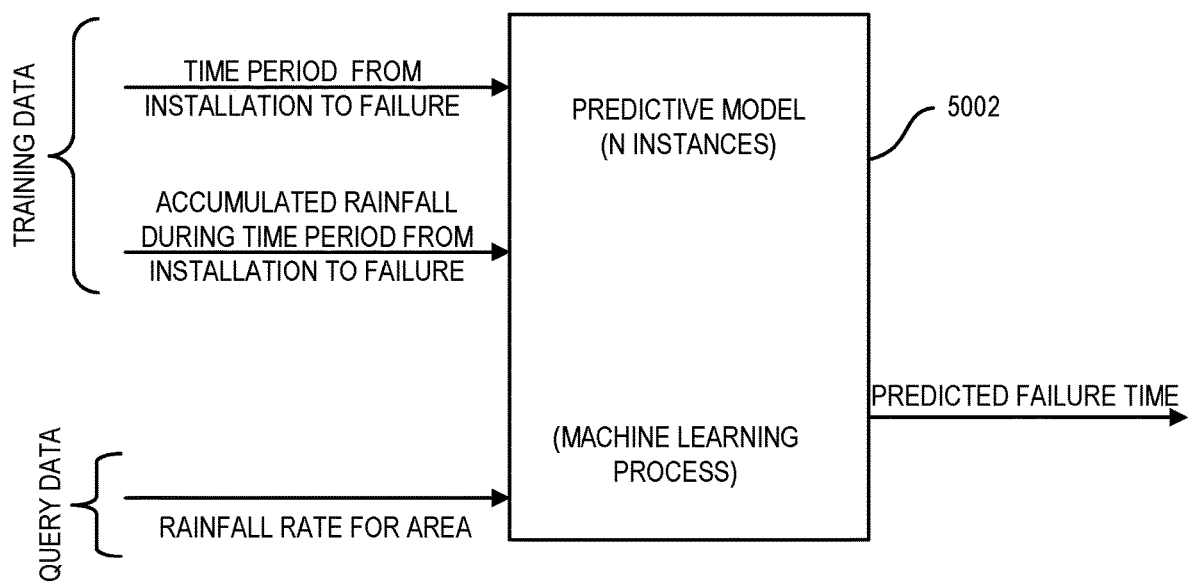
FIG. 5 depicts a predictive model that can be trained with use of supervised machine learning processes according to one embodiment.

Referring to factor $F_5$, factor $F_5$ can be determined by querying of a predictive model as set forth herein which can be trained to return a rating in dependence on the component's level of degradation attributable to weather experienced by that component up to that point in time. Authority 110 according to one embodiment at block 1119 can query predictive model 5002 as depicted in FIG. 5 for return of a predicted failure time associated to a building component. Performance of predictive model 5002 can be in dependence on received weather data received at block 1118.

Referring to FIG. 5 predictive model 5002 can be configured to predict a failure time of building component. Predictive model 5002 as depicted in FIG. 5 can be iteratively trained using supervised machine learning processes. Predictive model 5002 can be iteratively trained using training data. The training data can include iteratively applied sets of training data. Authority 110 can instantiate an instance of predictive model 5002 for each building component of a like classification across all buildings being managed by authority 110. For example, in the case of a roof component there can be N classifications of roofs and authority 110 can instantiate N instances of predictive model 5002, one for each different roof classification. An iteration of training data applied for training predictive model 5002 can include (a), failure time from installation associated to (b), accumulated rainfall during the installation period, i.e. accumulated rainfall during the time between installation and failure. The applied training datasets can be historical datasets for historical building components subject to inspection management by system 100. Historical data can be stored in data repository 108 and/or blockchain ledger 120. According to one example each time a building inspection, e.g. relating to a particular component is completed, authority 110 uses the inspection data where the inspection indicates an inspection failure as training data for training of predictive model that has been instantiated by authority 110. Thus, training data increases over time along with confidence levels associated with outputs produced by instantiated predictive models according to predictive model 5002. Predictive model 5002 can be trained with training data wherein the training data includes inspection failure data associated to a like classified building component. Predictive model 5002, once trained using supervised machine learning training processes, can be configured to respond to query data. While rainfall is referenced for purposes of illustration it will be seen that alternative predictive models trained with alternative weather parameters over time can be queried in the alternative or additionally with the results aggregated. Alternate weather parameters can include e.g. heat (temperature), humidity, barometric pressure, wind and the like.

For applying training data, authority 110 can (i) determine a failure time from installation for a building component from blockchain ledger 120, (ii) discern the location of the relevant building from blockchain ledger 120 and/or buildings area 2121 of data repository 108, and (iii) using such return data can query weather system 170 to determine weather information, e.g. rainfall for the area of the building over time from the time of installation until the time of failure and can use that determined accumulated rainfall data as training data of a training data set. In performing integrity processing block 1119, authority 110 for each building being considered can query a trained predictive model according to predictive model 5002 to determine whether an inspection schedule for that building is to be updated. Predictive model 5002 trained as described is able to predict a failure time of a building component in dependence on rainfall exposure of the component over time. Thus, predictive model 5002 trained as described is able to return a prediction as to predicted failure time using an input that specifies a rainfall rate for the area in which the building is located over time. The rainfall rate for the area applied as query data can in a simple use case be the historical average rainfall rate for the area. However, this applied data item, namely, rainfall rate for the area can be biased, i.e. increased or decreased in dependence on rainfall observed during the history from the time of installation of a building component being subject to inspection scheduling. Authority 110 at block 1119 can query predictive model 5002 to return a predicted failure time of a building component and based on the returned predicted failure time can adjust the building inspection schedule. Because query data can be in dependence on recent rainfall data, it is seen that query data applied to predictive model 5002 at block 1119 can be in dependence on weather data received at block 1118.

At block 1120, authority 110 can perform maintenance schedule update processing. Authority 110 performing maintenance schedule update processing can include authority 110 performing iterative queries of data repository 108 as indicated by query receive and respond block 1083 performed by data repository 108.

Authority 110 performing block 1120 can access building specification data stored in buildings area 2121 of data repository 108 to determine a maintenance schedule for all components of a building, e.g. including foundation components, framing components, and finishing components that are subject to maintenance. Maintenance schedule data stored in buildings area 2121 for each component can include a per specification "baseline" structural integrity rating for the component specifying the expected structural integrity rating for the component given its construction parameters and age and an associated maintenance time associated to the baseline rating. Embodiments herein wherein inspection times have associated baseline inspection schedules that are based on a baseline level of degradation for each component, it will be seen that authority 110 at block 1120 can iteratively adjust inspection schedule times in a manner that is identical to the adjustment of maintenance schedule times in dependence on the observed level of degradation of each component as compared to its baseline per specification expected level of degradation. Authority 110 at block 1120 can update a maintenance/inspection schedule in dependence on received sensed condition transaction data including IoT sensor data received at block 1112. For example, authority 110 can examine received IoT sensor data which indicates that a building component has degraded beyond a threshold level of degradation (this deriving the component structural integrity rating according to Eq. 1). In response to such determination, authority 110 at block 1120 can move up the date of maintenance and/or inspection of an impacted building. In some scenarios, IoT sensor data can include data from a certain IoT sensor device that indicates that a building component has failed to trigger a need for immediate repair maintenance and/or inspection.

Referring again to Eq. 1, authority 110 can assign a structural integrity rating for a respective component that is below, at, or above the baseline value. Ratings determined using Eq. 1 above the baseline value can indicate that the component has a current structural integrity rating that is better than its predicted per specification rating and ratings using Eq. 1 lower than the baseline value can indicate that the component has a current structural integrity rating lower than the per specification rating. Authority 110 performing block 1120 can adjust scheduled maintenance and/or inspection times for components to later times where the component has a current structural integrity rating higher than its per specification level and can adjust scheduled maintenance and/or inspection times to earlier times when a component by application of Eq. 1 has a current structural integrity rating lower than its per specification rating.

It will be seen with reference to block 1120, that authority 110 while storing within buildings area 2120 updated maintenance schedule times can also store updated inspection schedule times. In response to block 1120, authority 110 can proceed to block 1121.

On completion of maintenance schedule update processing block 1120 authority 110 can proceed to block 1121 to provide one or more output in dependence on a result of the maintenance schedule update processing block 1120.

Authority 110 at block 1122 in response to the updated maintenance and/or inspection schedule at block 1121 can provide one or more output. Authority 110 providing one or more output at block 1121 can include, e.g. providing one or more output to send notification data and/or control data to client computer devices 130A-130Z, one or more output to send notification data and/or control data to enterprise systems 140A-140Z, and/or can include one or more output to send control data to IoT sensor system 150.

Authority 110 at output block 1121 can send notification data and/or control data for receipt by client computer devices 130A-130Z at block 1305. Authority 110 at output block 1121 can send, e.g. notification data and/or control data for receipt by enterprise systems 140A-140Z at block 1404. Authority 110 for providing one or more output at block 1112 can send, e.g. control data for receipt by IoT sensor system 150 at block 1502. Notification data received by client computer devices 130A-130Z at block 1305 can include notification data that specifies an updated maintenance and/or inspection schedule. The notification data which can be text based can be displayed in area 4030 of user interface 4000 as shown in FIG. 4A.

Control data received by a client computer device at block 1305 can include, e.g. navigation data for navigating a user associated to a client computer device to a site of building maintenance and/or inspection so that a user who can be a construction member or inspector member can perform construction work (maintenance work) or an inspection at the building location. Control data received at block 1305 can also include navigation data provided by autonomous vehicle navigation data that navigates an autonomous vehicle of a user associated to a client computer device to a location of building maintenance or inspection. Notification data received by an enterprise system at block 1404 can include notification data that specifies an updated maintenance and/or inspection schedule updated at schedule update processing block 1120. Control data received by an enterprise system at block 1404 can include, e.g. navigation data for navigating a vehicle associated to an enterprise system to the location of building maintenance or inspection. Control data received at block 1404 can include, e.g. autonomous vehicle navigation data, for navigating an autonomous vehicle to a location of maintenance work or an inspection. For example, as set forth herein IoT sensor data from a particular IoT sensor device can indicate that a building component had failed requiring immediate maintenance and/or inspection, e.g. driving the component structural integrity rating to low rating according to Eq. 1. Responsively, authority 110 can provide one or more output to send control data in the form of navigation data to automatically navigate an autonomous vehicle of an enterprise associated to a construction member or inspector member, so that the problem can be immediately repaired by maintenance construction. On performance of the construction maintenance repair, IOT sensor system 150 can send a candidate blockchain block having construction stage transaction data representing the construction maintenance repair to authority 110 at iteratively performed block 1501. Authority 110 at iteratively performed block 1109 can examine the candidate block with reference to a consensus condition. On the consensus condition being satisfied the candidate block can be added to blockchain ledger 120.

Authority 110 providing one or more output at block 1121 can include authority 110 sending control data to IoT sensor system 150, e.g. to a particular IoT sensor device of IoT sensor system 150. For example, referring to FIG. 2, IoT sensor system 150 can include IoT sensor device 150A associated, e.g. fixedly associated to an autonomous vehicle 151, capable of moving between locations of different buildings being subject to maintenance and/or inspection management by system.

Control data sent by authority 110 at output block 1121 for receipt by IoT sensor system 150 can be control data received by IoT sensor device 150A associated to an autonomous vehicle 151 to cause an autonomous vehicle 151 having an associated computing node to move to a different location to responsively perform, e.g. on an immediate basis, emergency inspection of a building which, according to updated schedule data returned at block 1120. Performing the inspection can include using building inspection data captured with use of IoT sensor device 150A associated to an autonomous vehicle 151.

The received control data received at block 1503 can include control data causing an autonomous vehicle 151, having an associated computing node to perform in a manner to collect building inspection data that is sufficient to facilitate determination of an inspection pass or fail by vehicle 151 and/or authority 110. The control data received at block 1503 can also include control data which causes an autonomous vehicle 151 having an associated computing node to send collected building inspection transaction data with or without metadata indicating pass/fail status of an inspection to authority 110 on completion of collection of such building inspection data. Vehicle 151 having an associated computing node can send transaction data to authority 110 with blockchain header data so that the transaction data is processed as a blockchain candidate block. In response to the received building inspection transaction data. authority 110 can process the received transaction data as a blockchain candidate block e.g. using Table A consensus rules to validate the candidate block and to add the block to blockchain ledger 120 in response to a consensus condition is satisfied.

In response to completion of block 1121 authority 110 can proceed to block 1121 to perform emergency response processing.

At block 1122, authority 110 performing emergency response processing can include authority 110 determining a structural integrity rating for a building using Eq. 3 as set forth herein below.

$$P_B = (\Sigma_{i=1}^{n} P_i W_i)/K \qquad \text{(Eq. 3)}$$

Where $P_B$ is the structural integrity rating for a current building, where i refers to instances of building components, n is the total number of components defining the building, Pi is the structural component rating associated with the respective specific component as may be determined using Eq. 1, and Wi is a weight associated to a respective specific component as may be determined using a weight mapping table stored in buildings area 2121. Authority 110 can iteratively perform processing to determine building structure integrity for all buildings being managed by authority 110 and can make available the rating data to a wide variety of users of system 100.

Authority 110 can be configured so that in buildings area 2121 data repository 108 stores specification data for each building, wherein there is specified for each component of the building in a weight mapping table that specifies the significance of the component in terms of the overall structural integrity of the building. Authority 110 can look up weight ratings from the noted specification data for determining weights associated with each component considered in the summation for determining of a building's cumulative structural integrity $P_B$. With further reference to Eq. 3, K is a per specification expected structural integrity rating expected for the building. Accordingly, referring to Eq. 3, buildings that have higher than expected total structural integrity will have building structural integrity ratings $P_B > 1$ and buildings having lower than expected total structural integrity will have structural integrity ratings $P_B < 1$.

At block 1122 authority 110 can perform emergency response process 117 as set forth in connection with FIG. 1. Performing emergency response process 115 at block 1122 can include authority 110 activating emergency response process 115 described in reference to FIG. 1. Authority 110 performing maintenance schedule update processing at block 1122 can include authority 110 activating integrity determining process 115 described in connection with FIG. 1.

For performing emergency response processing at block 1122, authority 110 can perform data queries on data repository 108 as indicated by query receive and respond block 1084 performed by data repository 108. Authority 110 performing emergency response processing at block 1122 can include authority 110 querying data of blockchain ledger 120 as indicated by query receive and respond block 1203 performed by blockchain ledger 120. Authority 110 at emergency response processing block 1122 can send ledger query data for receipt by blockchain ledger 120 at block 1203 and blockchain ledger 120 can responsively return query response data.

For performing emergency response processing at block 1122 authority 110 can examine weather data received at block 1118 to determine whether there is a predicted emergency weather event, e.g. a hurricane or a tornado in an area being services by system 100. In the event that weather data indicates an emergency event, authority 110 at block 1122 can determine an area associated to the weather event and can identify buildings being subject to inspection management by system 100 within the area.

Authority 110 further, at emergency response processing block 1122 can perform processing to determine a structural integrity of identified buildings within an emergency event area. The determining of structural integrity according to one embodiment can be in dependence on recorded code inspection data recorded in blockchain ledger 120. Authority 110 at block 1122 can bias a structural integrity rating for a building upward in the case that the building has a positive code inspection compliance record and conversely can bias a structural integrity rating for a building downward in the case that the building has a negative inspection code compliance record specified by ledger data of blockchain ledger 120. Authority 110 at block 1122 can designate buildings that have structural integrity ratings above a threshold as "safe" buildings. Authority 110 in response to completion of block 1122 can proceed to block 1123.

At block 1123, authority 110 can provide one or more output in dependence on the emergency response processing at block 1122. Authority 110 to provide one or more output at block 1123 can provide notification data and/or control data for receipt by client computer devices 130A-130Z at block 1305. Authority 110 at block 1123 to provide one or more output can send notification data and/or control data for receipt by enterprise systems 140A-140Z at block 1405. Authority 110 at block 1123 to provide one or more output can send control data for receipt by IoT sensor system 150 at block 1504. Notification data received at block 1305 can be text based notification data which, like text based notification data received by client computer devices 130A-130Z at block 1304, can be displayed on notification area 4030 of user interface 4000 which can be a displayed user interface as depicted in FIG. 4A for display on a display of client computer device.

Authority 110 at all times can be receiving location data respecting the locations of respective ones of client computer devices 130A-130Z. Such location data can be reported by the client computer devices themselves or can be location data received from a locating service that does not include a locating service, e.g. a cellular network based locating service or WiFi based locating service that does not utilize location data reported from a client computer device. Based on such obtained location data specifying respective locations of client computer devices 130A-130Z authority 110 at block 1122 can determine the nearest "safe" building locations to each respective user of client computer devices and can report those locations. Accordingly, notification data received at block 1305 can include notification data that specifies for each respective client computer device associated to a user the "safe" location that is of closest distance to the current location to the user associated to the receiving client computer device. Accordingly, as depicted in FIG. 4A, user interface 4000 in notification area 4030 can display such text based notification as "500 Maple Road is the nearest safe building". Control data received at block 1305 can include navigation data that navigates a user to a location of a determined safe building. The navigation data can include, e.g. a destination data point that is input by navigation software running on the client computer device so that the received navigation data is operative to navigate the user to a "safe" building location. According to one embodiment, the navigation data can include navigation data to navigate an autonomous vehicle of the user so that the user can be automatically driven to the location of the "safe" building. Notification data received by enterprise systems 140A-140Z received at block 1405 can take the form as depicted in FIGS. 6 and 7 and can be differentiated in dependence on the type of enterprise system.

Figure 6:
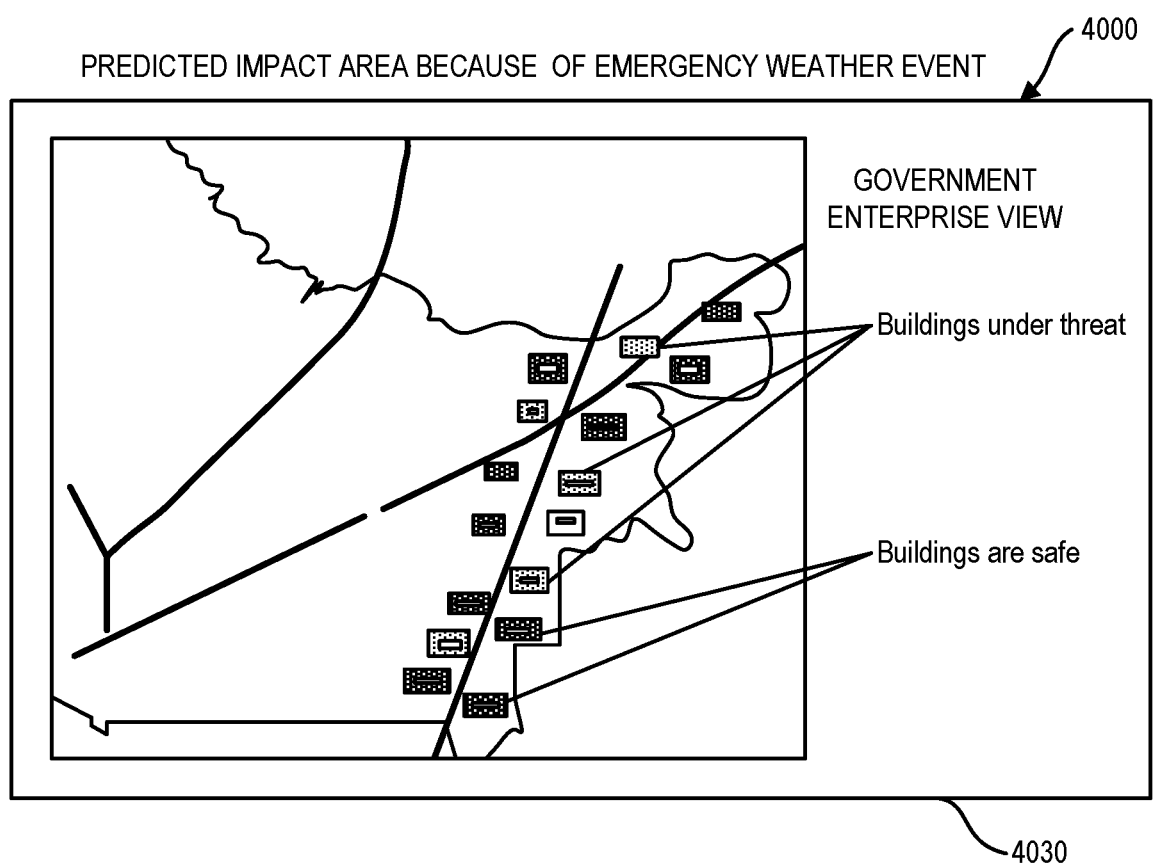
FIG. 6 depicts a displayed notification that can be displayed on a user interface according to one embodiment.

FIG. 6 depicts notification data received by an enterprise system in the case that the enterprise system is a government enterprise system. Client computer devices provides by administrator client computer devices associated to enterprise systems 140A-140Z can display user interfaces according to user interface 4000 and can also include displayed notification areas according to notification area 4030 as depicted in FIG. 4A. FIG. 6 depicts notification area for display on a user interface of an administrator client computer device associated to an enterprise system. Area 4030 can display a map of an emergency weather event area and can display icons at locations of different buildings. Area 4040 can display highlights, i.e. extending line segments as shown depicting (a) buildings under threat by the emergency weather event and (b) buildings that are safe from the emergency weather event as determined by the emergency response processing performed by authority 110 at block 1122.

Figure 7:
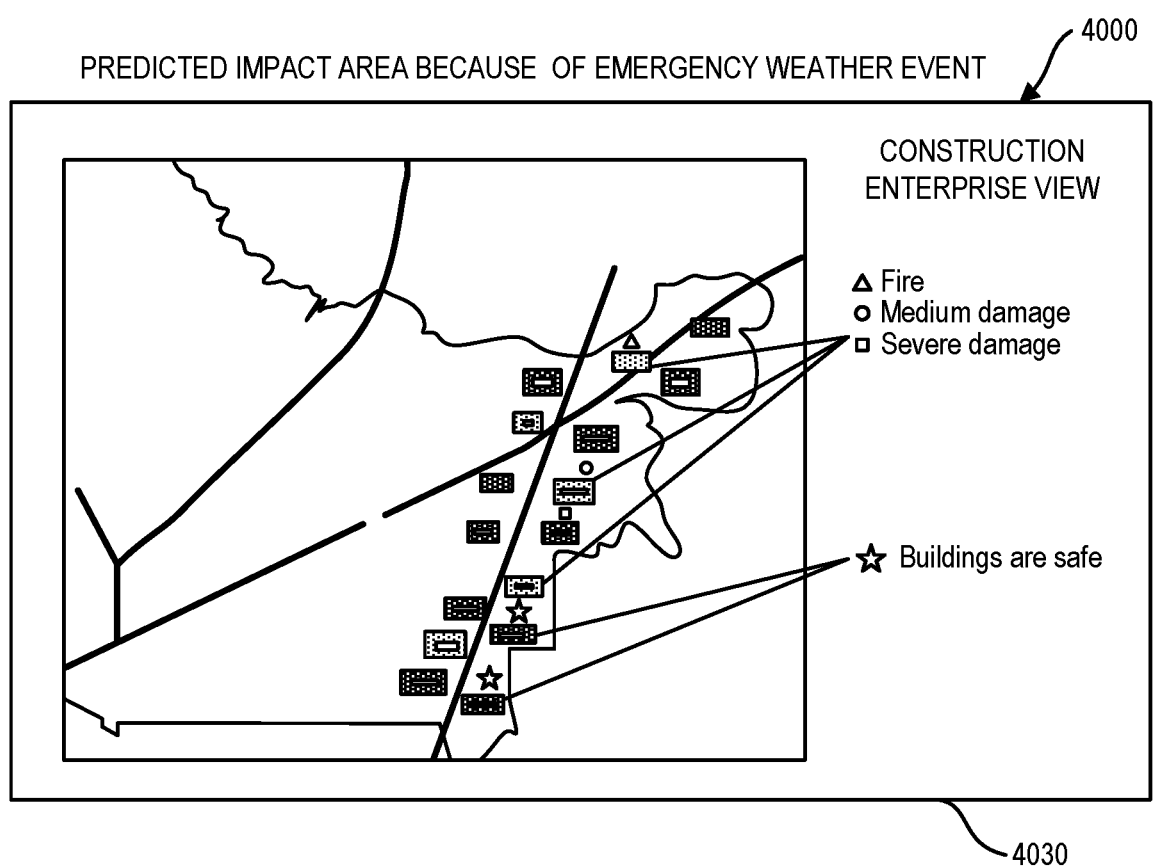
FIG. 7 depicts a notification that can be displayed on a user interface according to one embodiment.

FIG. 7 depicts notification area 4030 for display on a client computer device provided by an administrator client computer device of an enterprise system where the enterprise associated with the enterprise system is a building construction enterprise. In the case of an emergency weather event, building construction enterprises can be sent notifications specifying buildings and their particular problems so that the building construction enterprise can take action and is in accordance with a specified problem. As depicted in FIG. 7, notification area 4030 can display differentiated icons that specify differentiated problems between different buildings. Referring to FIG. 7, buildings predicted to have fire damage can be specified with a circle, buildings predicted to incur medium damage can be specified with a square, and buildings predicted to suffer severe damage can be specified with a triangle. Safe areas as shown in FIG. 7 can be specified with a star. Control data received at block 1405 can include, e.g. navigation data for navigating one or more vehicle of an enterprise such as a building construction enterprise to specific locations, e.g. building locations where a building is predicted to be in need of repair. The navigation data can include, e.g. a specified destination for input into navigation software running on a vehicle of an enterprise system receiving the navigation data. The navigation data can include autonomous vehicle navigation data that is operative so that when the navigation data is received by an autonomous vehicle, the autonomous vehicle automatically drives to a specified location, e.g. the location of a building in need of repair.

Authority 110 at block 1124 can return to block 1106 for receipt of building inspection data from client computer devices 130A-130Z. It can be seen that blocks 1106-1124 can be performed iteratively through an entire deployment period of system 100.

Embodiments herein can use a blockchain ledger to track each and every quality measure during any work product development, like construction work, and notifying any deviation to proper authority in a proactive manner. Accordingly, corrective action can be taken in advance and can be automated responsively, and many failures can be avoided. There is set forth herein an IoT based solution wherein a blockchain ledger can be notified about the quality of the construction work.

As set forth herein, various quality measures can be recorded into a blockchain ledger for any building, thus there can be calculated for any building: the capacity of the building, maximum payload, and resistance capacity during any weather emergency event, like a storm, flood etc.

Embodiments here can expose a blockchain ledger for use by e.g. a government enterprise to determine which buildings can be used for giving a shelter for how many people, or where rescue is required considering the predicted magnitude of devastating force of the natural calamity. According to one embodiment, a single blockchain ledger can serve as the singular authoritative building code data repository that can be leveraged by building code government enterprises for validation, gap identification and tracking of remediation of building code noncompliance.

Embodiments herein can monitor and ensure that all proactive maintenance is completed in accordance to the set schedule in manufacturer's guides for respective building components. The dates of maintenance can vary depending on internal and external factors, such as floods or storms. Embodiments herein can better predict when the maintenance should take place. This information can be stored in a blockchain ledger along with the details of an original building construction. Accordingly, owners of a building can be motivated to maintain a building as the maintenance cost will be reflected in the value of the building.

Embodiments herein recognize that building codes change with time. For example a fire event can identify a type of insulation which is not safe for high rise building, and new building codes can be instituted by a government enterprise. Changes to the building code can be retroactively applicable to older constructions, such as accessibility, fire sprinkler requirements, types of insulation, etc. Embodiments herein can identify if the building meets the new building codes or if it does not. This is especially crucial for internal components that do not have easy access.

While any construction work is in progress, then actual measures of various KPIs (Key performance Indicators) can be captured to identify the deviation from the designed parameters. The system set forth herein can identify the age of the building and current condition of various parameters. The system herein can identify current capacity of any construction work or building, in terms of payload, resistance to natural calamity etc.

For example, while any construction work is in progress, then there will be some deviation from the actual design parameters, with the help of IoT sensors, the actual measures of various parameters will be captured, so actual development capacity of the construction work will be recalculated. At the same time, based on the age of the building, repairing work, quality of repairing work etc. will be captured through IoT sensors. So, the current capacity of any building will be calculated and the same will be up-to-date according to blockchain ledger data.

Weather and geographic data can be analyzed to predict the magnitude of devastating force of any natural calamity, accordingly will be comparing the same with actual measures of various KPIs (Key performance Indicators) of any building to identify which building or construction work will be under threat or safe during the predicted natural calamity.

For example, one tornado is predicted, so the direction of movement, magnitude of devastating force etc. of the storm can be predicted. Various actual KPIs of any construction work can be captured, so, the system herein can be comparing the predicted devastating force of any natural calamity with actual capacity of any construction work of building, to identify which construction work or building can withstand the devastating force or which building is under threat.

During any predicted emergency weather event, the system herein can be predicting which construction work or buildings are under threat based on current capacity, and which building can withstand the emergency weather event, and will be creating an evacuation plan for the city, like how many people can be evacuated from which buildings and where the shelters can be provided etc. For example, it is identified that five buildings are identified as threat, remaining ten buildings are safe for the predicted emergency weather event, and accordingly evaluation and rescue plan will be created.

By analyzing an IoT feed, the system herein can be predicting which building is be repaired or demolished considering the current condition, age of the building and historical natural calamity around the area. For example, an IoT based sensor feed can be analyzed to identify the current condition of any building, and accordingly can notify which building needs repair.

By analyzing manufacturer's and government enterprise recommendations and changes to the building codes, combined with the weather patterns and IoT feed, the system herein can be predicting which buildings are to be subject to repair. For example, if a fire occurs and an isolation is found to be at fault for poorly preventing a fire from spreading, then the system can identify which buildings contain this type of insulation and what type of work needs to be completed to ensure the building is safe. Additionally, if batch of pipes has been recalled due to poor quality standard, then we will be able to identify where this piping was used, for example on floors 7-9.

Embodiments herein can provide a government enterprise with the possible available shelters in the case of a weather emergency event. Embodiment herein can predict danger areas which help a government enterprise an ability to make a decision to evacuate certain areas. Embodiments herein can provide construction enterprises with the expected damages which helps them to make a decision which buildings have the most problem and which need emergency maintenance, Embodiments herein can provide owners of building with a list of issues that need to be addressed as part of proactive maintenance that should be performed ahead of schedule or at a later time given the internal and external factors that affect the building wear and tear, as well as provide information to potential buyers about the state of the building. Embodiments herein can provide regulators with a list of buildings which are in compliance with building codes. Embodiments herein can provide regulators with a list of buildings which have outstanding maintenance issues. Embodiments herein can provide regulators with tracking remediation activities. Embodiments herein can provide government enterprises with real time compliance insight on regulatory change implications.

Embodiments herein can track a building's progress including inspection history and can notify a government enterprise with the buildings can be considered as shelters in time of an emergency weather event. Embodiments herein can predict the damage level in time of a weather emergency event.

Embodiments herein can use blockchain data specifying building construction records as well as data on the exposure to elements (internal, such as a flood and external, such as a storm) to determine whether proactive maintenance needs to be performed ahead of schedule. Embodiments herein can use blockchain data specifying building construction records to identify if there is required work related to a recall or related to a change in building codes and isolate where that work needs to take place.

For example, pipes from batch A123 are defective and the pipes from this batch were used in floors 7-9 and need to be replaced. Embodiments herein can use blockchain data specifying building code inspection records to assist government enterprises in identifying buildings that are in compliance, out of compliance, tracking remediation and enable forecasting impact of building code changes.

According to one embodiment, a weather system can predict an emergency weather event and by analyzing the current capacity and strength of each construction work or building, an authority associated to a blockchain ledger recording building construction (including repair) and inspection records can be identifying which buildings are under threat or safe.

While any construction or repair work is in progress, then various cameras, e.g. autonomous vehicle-based cameras can be deployed. Cameras including autonomous vehicle based cameras can also be deployed for obtaining data for use in performing building inspections.

A construction machine can have various sensors installed to detect rotation and speed of rotation of equipment during any mixing, and the sensor parameters can be recorded.

Different ingredients (sand, cement, steel, stone) can have different supplier, and a blockchain ledger can have data recorded therein to track an amount of ingredients purchased from different suppliers.

During any consumption, software can be tracking what ingredients are taken from stores to use during mixing and will be checking different quantities of ingredients.

Based on the checkout of various ingredients from the store, software can be identifying the planned proportionate of the ingredients.

During mixing of the ingredients, camera and sensor installed in the surrounding can be identifying the mixing proportionate. Video analysis data will be performed from various cameras installed in the surrounding The video analysis engine will be assigning a universally unique identifier (UUID) for each lot of mixing process, and with video object tracking software can be identifying which part of the construction area the identified unique mixing is applied. A record for each construction stage can be recorded into a blockchain ledger. A blockchain ledger can record a transaction for the unique portion of the construction block where the unique mixing lot is used.

Using video and sensor data analysis, software can also be identifying the activities that are being performed by construction workers and will also be identifying the duration of each such activities.

A blockchain ledger can have recorded therein transaction for each unique block (step) of construction and can also be identifying each and every activity performed on that block, duration of each activities, and will also be identifying proportionate of the mixing activity.

As the each and every step can be recorded in blockchain, transparency can be improved.

An authority associated with a blockchain ledger can be gathering the actual values of various parameters, like sand, cement, steel, stone ratio etc, An authority associated with a blockchain ledger can be identifying deviation among each of the parameters from designed parameters, and according using structural engineering, the strength of the construction work or building will be recalculated considering the actual measures of various parameters.

The actual strength against various parameters can be recalculated for each and every building. Each building can have various sensors installed to identify any decay, wear and tear, damages etc.

An authority associated with a blockchain ledger can be gathering the actual measures of various parameters while it was built, and then can be identifying any wear and tear over a period of a time, because of change in weather, surrounding context, like an unplanned pond was dug near by the building, which has lowered the strength of the building. Or for example the building may have aged, or some of the structural steel became rusted etc. Data of camera sensor IOT devices and various sensors disposed about a building can be analyzed to find the current condition of the building.

An authority associated to a blockchain ledger can be analyzing the gathered data against manufacturer's proactive guidelines and monitoring when certain parts of the building are either starting to fail or may require maintenance/repair ahead of predictive schedule given an emergency weather event. A n emergency weather event can be a storm that went through the area and the building membrane may need premature change or a building flood caused additional wear and tear on the building.

An authority associated to a blockchain ledger can be analyzing changes to the building codes to identify if any of the building's components require changes to reflect the changes to building codes.

An authority associated to a blockchain ledger can be recalculating the current strength of any construction work or building considering the strength of the building when it was built, age of the building or construction work, wear and tear or damages in various structures, like one crack is detected, or change in the surrounding, like one pond was dug, or pollution will create rusting on the steel structure etc.

A calculation engine will calculate up-to-date strength of each and every building an returned data can be stored in an authority data repository associated to a blockchain ledger.

When any weather emergency is predicted, a strength associated to the weather emergency can be calculated.

An authority associated to a blockchain ledger can be validating which building can withstand the impact from the predicted natural calamity, and accordingly can be identifying which construction work or building are under threat and which are comparatively safe.

An authority associated to a blockchain ledger can be identifying the people who are staying in those building which are under threat, and based on number of population evacuation plan will be created, and will also be identifying where the shelter can be provided.

Certain embodiments herein may offer various technical computing advantages involving computing advantages to address problems arising in the realm of computer systems and computer networks, including computer systems and networks featuring a blockchain ledger. Embodiments herein can utilize secure by design and trusted data features of a blockchain ledger to facilitate action decisions in technical environment of building construction and building maintenance. Returned action decisions can include action decisions to activate automated processes such as automated processes for maintenance repair construction and/or for building inspection of a building. Embodiments can include automated deployment, e.g. of an autonomous vehicle and/or autonomous vehicles for remediation of building problems e.g. by maintenance construction and/or for the performance of building inspections. Machine learning processes can be performed for increased accuracy and for a reduction of reliance on rules based criterion and thus, reduced computational overhead. For enhancement of computational accuracies embodiments can feature computational platforms existing only in the realm of computer networks such as artificial intelligence (AI) platforms and machine learning platforms. Embodiments herein can employ data structuring processes, e.g. processing for transforming unstructured data into a form optimized for computerized processing. Embodiments herein can include particular arrangements for both collecting rich data into one or more data repository including into a blockchain ledger and additional particular arrangements for updating such data and for use of that data to drive AI decision making. Embodiments herein can include the collection and storing of historical data into a data repository and using historical data for performance of machine learning processes to train a predictive model. Embodiments herein can include querying of a trained predictive model trained by machine learning to return action decisions such as action decisions specifying performance of a building inspection with respect to a building. Embodiments herein can respond to predicted weather emergency events with use of secure by design data of a blockchain ledger. Safe buildings can be identified with use of secure by design data stored in a blockchain ledger.

Action decisions can be returned for mobilization of users to identified safe buildings. Certain embodiments herein can be implemented with use of a cloud platform/datacenter and various types including Software as a Service (SaaS), Platform as a Services (Paas), Database as a Services (DBaaS), and combinations thereof based on types of subscription.

Figure 8:
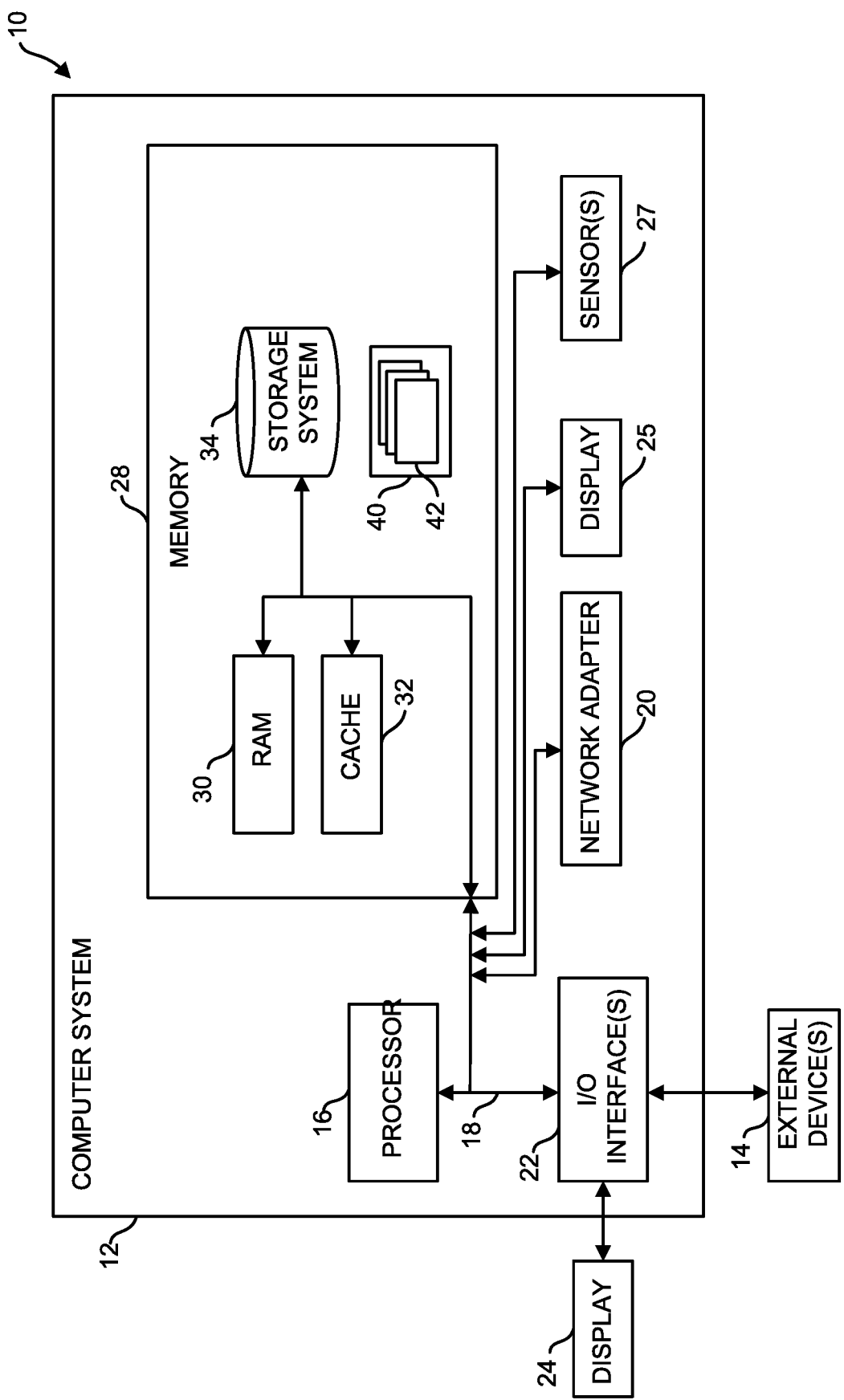
FIG. 8 depicts a computing node according to one embodiment.
Figure 9:
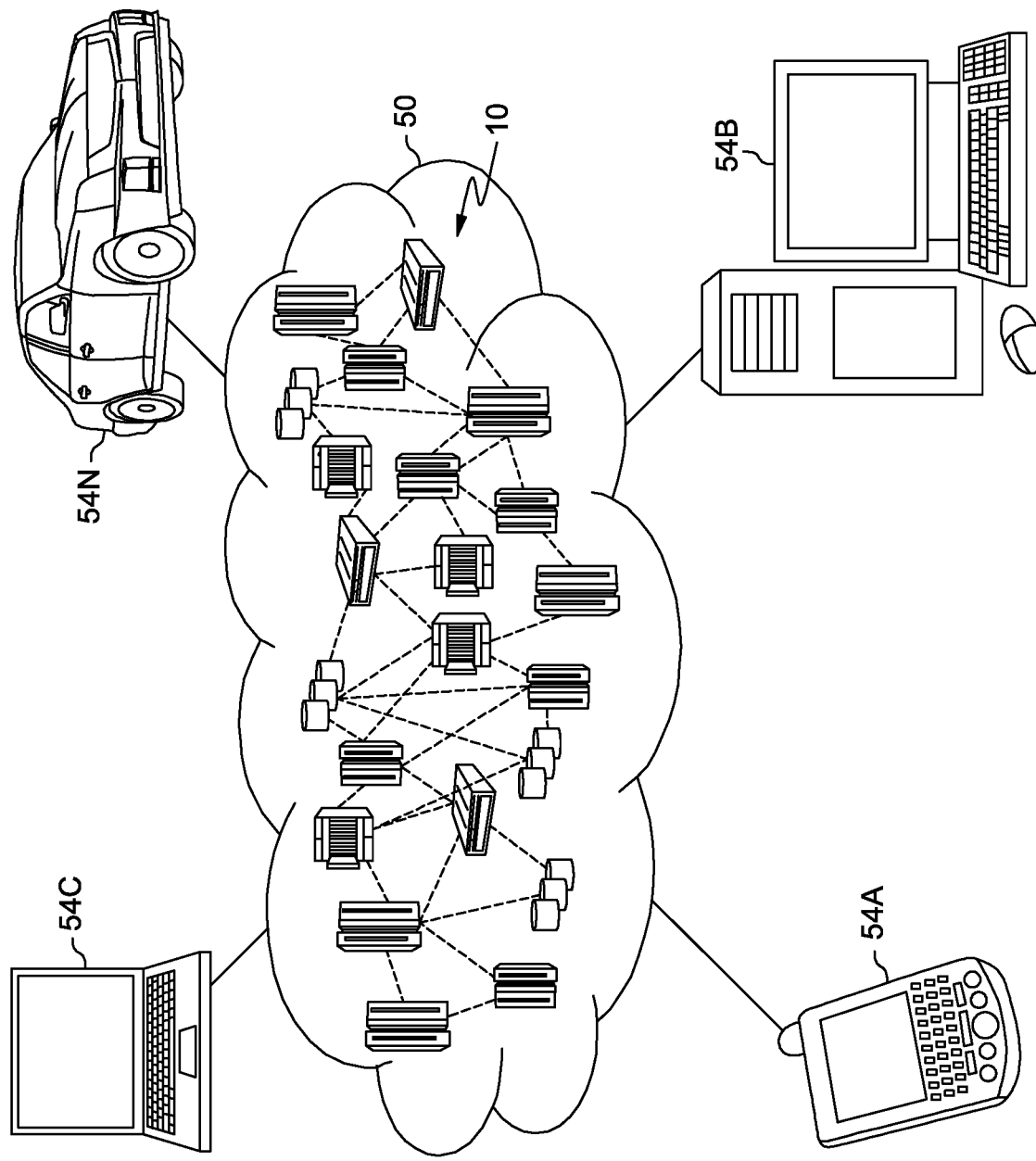
FIG. 9 depicts a cloud computing environment according to one embodiment.
Figure 10:
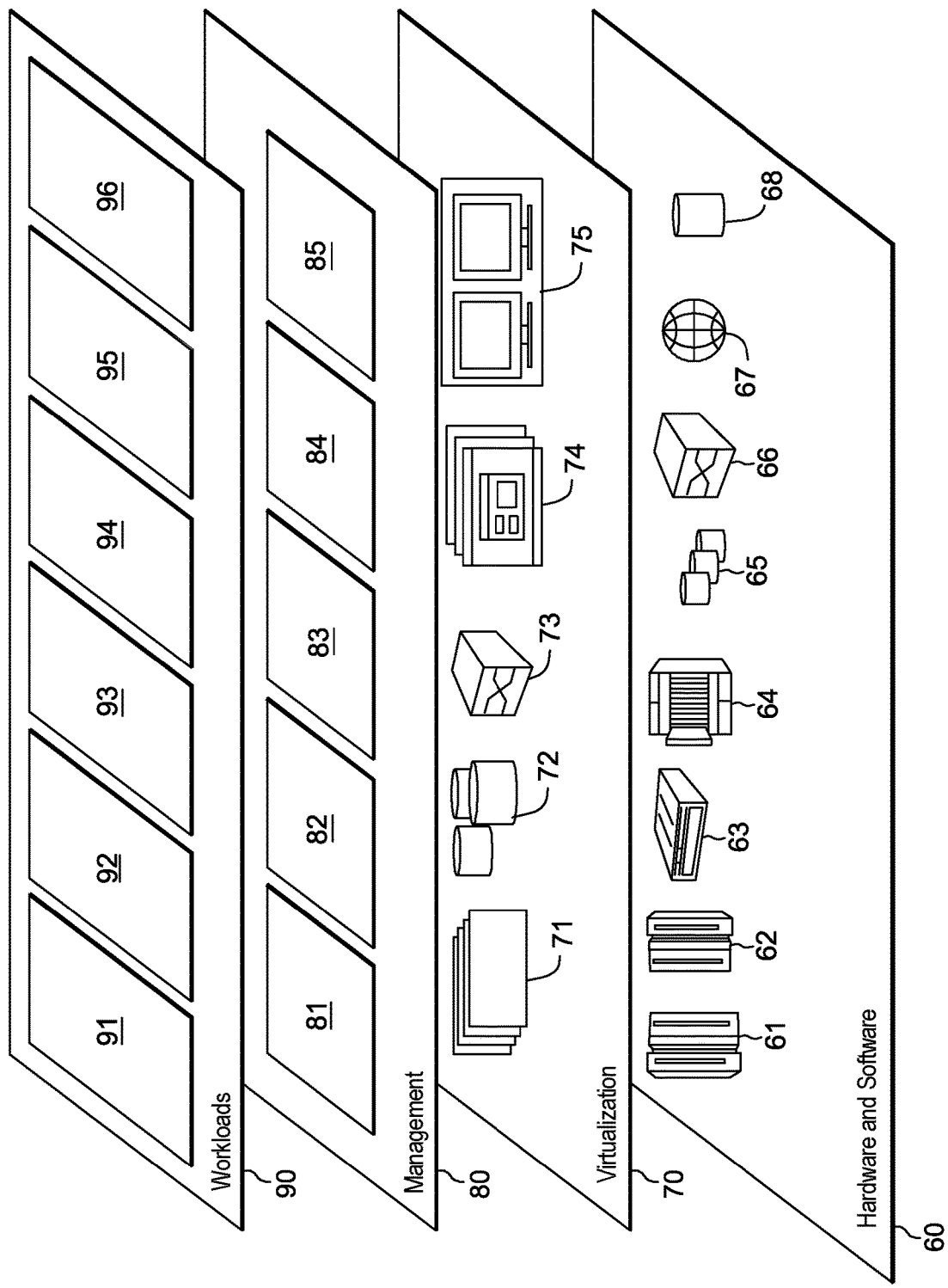
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, authority 110 can include one or more computing node 10 and can include one or more program 40 for performing functions described with reference to authority 110 as set forth in the flowchart of FIGS. 3A-3B. In one embodiment, one or more client computer device 130A-130Z can include one or more computing node 10 and can include one or more program 40 for performing functions described with reference to one or more client computer device 130A-130Z as set forth in the flowchart of FIGS. 3A-3B. In one embodiment, enterprise systems 140A-140Z can include one or more computing node 10 and can include one or more program 40 for performing functions described with reference to systems 140A-140Z as set forth in the flowchart of FIGS. 3A-3B. In one embodiment, systems 150, and 170 can include one or more computing node 10 and can include one or more program 40 for performing functions described with reference to systems 150, and 170 as set forth in the flowchart of FIGS. 3A-3B. In one embodiment, blockchain ledger 120 can include one or more computing node 10 and can include one or more program 40 for performing functions described with reference to ledger as set forth in the flowchart of FIGS. 3A-3B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for recording building transaction data into a blockchain ledger and using such data as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
obtaining first building event transaction data of a building using a first Internet of Things (IoT) device;
recording a first blockchain block in a blockchain ledger, the first blockchain block having a timestamp and the first building event transaction data;
obtaining second building event transaction data of the building using a second data source selected from the group consisting of (a) a second IoT device disposed at a location of the building, (b) a third IoT device disposed on an autonomous vehicle, (c) a handheld device of a first inspector member, (d) a handheld device of a second inspector member, and (e) an enterprise system of a financial member;
recording a second blockchain block in the blockchain ledger, the second blockchain block having a timestamp, and the second building event transaction data;
examining data of the first blockchain block and the second blockchain block in order to determine the structural integrity of the building; and in response to the examining: adjusting a maintenance schedule for the building and sending navigation data to a first autonomous vehicle for navigating a construction member to the building for maintenance of a building component;

wherein the method includes sending a communication to dispatch one or more second autonomous vehicle to (a) pick up one or more user based on location data specifying location of the one or more user, and (b) autonomously drive the one or more user to one or more safe location.

2. The computer implemented method of claim 1, wherein the first building event transaction data represents a construction stage of a first building component, wherein the second building event transaction data represents a sensed condition of the first building component, wherein the examining data of the first blockchain block includes determining a first structural integrity rating of the first building component according to a first factor, and wherein the examining data of the second blockchain block includes determining a second structural integrity rating of the first building component according to a second factor.

3. The computer implemented method of claim 1, wherein the first building event transaction data represents a construction stage of a first building component, wherein the second building event transaction data represents a sensed condition of the first building component, wherein the examining data of the first blockchain block includes determining a first structural integrity rating of the first building component according to a first factor, and wherein the examining data of the second blockchain block includes determining a second structural integrity rating of the first building component according to a second factor, wherein the method includes adjusting a maintenance schedule for the first building component using the first structural integrity rating and the second structural integrity rating, and wherein the providing one or more output includes sending text based notification data to a construction member to notify the construction member as to the adjustment of the maintenance schedule.

4. The computer implemented method of claim 1, wherein the first building event transaction data represents a construction stage of a first building component, wherein the second building event transaction data represents a sensed condition of the first building component, wherein the examining data of the first blockchain block includes determining a first structural integrity rating of the first building component according to a first factor, and wherein the examining data of the second blockchain block includes determining a second structural integrity rating of the first building component according to a second factor, wherein the method includes adjusting a maintenance schedule for the first building component using the first structural integrity rating and the second structural integrity rating, and wherein the providing one or more output includes sending navigation data to an autonomous vehicle to automatically navigate a construction member to the building for maintenance of the building component according to the adjusted maintenance schedule.

5. The computer implemented method of claim 1, wherein the second blockchain block includes a geostamp indicating a location of the second data source at a time of the obtaining second building event transaction data, wherein the examining the second blockchain block includes using the geostamp and a mapping data structure to identify a building component represented by the second building event transaction data, wherein the mapping data structure maps identifiers for building components to locations of the building components within the building.

6. The computer implemented method of claim 1, wherein the method includes identifying a membership classification of an author of the first block and selecting a consensus rule based on the membership classification, wherein the recording the first blockchain block in the blockchain ledger is performed in response to determination that the consensus rule is satisfied.

7. The computer implemented method of claim 1, wherein the method includes identifying a first membership classification of an author of the first block, and selecting a first consensus rule based on the author of the first block having the first membership classification, wherein the recording the first blockchain block in the blockchain ledger is performed in response to determination that the first consensus rule is satisfied, wherein the method includes identifying a second membership classification of an author of the second block, and selecting a second consensus rule based on the author of the second blockchain having the second membership classification, wherein the recording the second blockchain block in the blockchain ledger is performed in response to determination that the second consensus rule is satisfied.

8. The computer implemented method of claim 1, wherein the method includes identifying a first membership classification of an author of the first block, and selecting a first consensus rule based on the author of the first block having the first membership classification, wherein the recording the first blockchain block in the blockchain ledger is performed in response to determination that the first consensus rule is satisfied, wherein the method includes identifying a second membership classification of an author of the second block, and selecting a second consensus rule based on the author of the second blockchain having the second membership classification, wherein the recording the second blockchain block in the blockchain ledger is performed in response to determination that the second consensus rule is satisfied, wherein the first membership classification is a financial member classification, wherein the second membership classification is a construction member classification.

9. The computer implemented method of claim 1, wherein the first building event transaction data is construction stage transaction data that specifies an attribute of a construction stage for constructing the building, wherein the first data source is provided by a first Internet of Things (IoT) device, and wherein the second data sources is selected from the group consisting of (a) a second IoT device fixedly disposed at a location of the building, (b) a third IoT device disposed on an autonomous vehicle, (c) a hand held client computer device of a first inspector, (d) a hand held computer device of a second inspector member, and (e) an enterprise system of a financial member.

10. The computer implemented method of claim 1, wherein the first building event transaction data is construction stage transaction data that specifies an attribute of a construction stage for constructing the building, wherein the second building event transaction data is code inspection transaction data specifying an attribute of code inspection of a component of the building.

11. The computer implemented method of claim 1, wherein the first building event transaction data is financial transaction data that specifies an attribute of a financial event the building, wherein the second building event transaction data is construction stage transaction data that specifies an attribute of a construction stage for constructing the building.

12. The computer implemented method of claim 1, wherein the first building event transaction data is financial transaction data that specifies an attribute of a financial event the building, wherein the second building event transaction data is construction stage transaction data that specifies an attribute of a construction stage for constructing the building, wherein the method includes based on the examining data of the first blockchain block and the second blockchain block returning a structural integrity rating of a component of the building, wherein the first blockchain block is authored by a financial member of the blockchain ledger having a financial member classification, wherein the method includes maintaining a reputation rating for the financial member who is the author of the first blockchain block, wherein the examining is performed so that the structural integrity rating of the component of the building varies in dependence on the reputation rating for the financial member who is the author of the first blockchain block.

13. The computer implemented method of claim 1, wherein the first building event transaction data is financial transaction data that specifies an attribute of a financial event the building, wherein the second building event transaction data is construction stage transaction data that specifies an attribute of a construction stage for constructing the building, wherein the method includes based on the examining data of the first blockchain block and the second blockchain block returning a structural integrity rating of a component of the building, wherein the first blockchain block is authored by a financial member of the blockchain ledger having a financial member classification, wherein the method includes maintaining a reputation rating for the financial member who is the author of the first blockchain block, wherein the examining is performed so that the structural integrity rating of the component of the building varies in dependence on the reputation rating for the financial member who is the author of the first blockchain block, and wherein the method includes maintaining second through Nth blockchain ledgers respectively for second through Nth buildings, and identifying a count of ledgers of the second through Nth blockchain ledgers for which the financial member has authored a block, wherein the reputation rating for the financial member is in dependence of the count of ledgers.

14. The computer implemented method of claim 1, wherein the first building event transaction data includes a video file, wherein video data of the video file represents the building, wherein the method includes reading the video from the first blockchain block and processing the video data to determine whether the building has passed a code inspection.

15. The computer implemented method of claim 1, wherein the one or more output includes an output to dispatch an autonomous vehicle to the certain building, wherein the method includes capturing by an autonomous vehicle at an area of the certain building, building inspection information, and recording into the blockchain ledger a third blockchain block that includes the building inspection information.

16. The computer implemented method of claim 1, wherein the method includes receiving weather data predicting a dangerous weather event to occur within a specified area including a set of buildings of the plurality of buildings, wherein the first building event transaction data represents a first building component, wherein the second building event transaction data represents a second building component, wherein the examining data of the first blockchain block includes determining a first structural integrity rating of the first building component, and wherein the examining data of the second blockchain block includes determining a second structural integrity rating of the second building component, wherein the method includes using the first structural integrity rating and the second structural integrity rating to provide a structural integrity rating of the building, and wherein the method includes using the structural integrity rating of the building to identify the building as a safe building amongst safe buildings in the specified area, wherein the one or more output includes sending a communication to dispatch driverless vehicles to (a) pick up users based on location data specifying locations of the users, and (b) automatically drive the users to buildings of the safe buildings including the building.

17. The computer implemented method of claim 1, wherein the method includes identifying a first membership classification of an author of the first block, and selecting a first consensus rule based on the author of the first block having the first membership classification, wherein the recording the first blockchain block in the blockchain ledger is performed in response to determination that the first consensus rule is satisfied, wherein the method includes identifying a second membership classification of an author of the second block, and selecting a second consensus rule based on the author of the second blockchain having the second membership classification, wherein the recording the second blockchain block in the blockchain ledger is performed in response to determination that the second consensus rule is satisfied, wherein the second blockchain block includes a geostamp indicating a location of the second data source at a time of the obtaining second building event transaction data, wherein the examining the second blockchain block includes using the geostamp and a mapping data structure to identify a building component represented by the second building event transaction data, wherein the mapping data structure maps identifiers for building components to locations of the building components within the building, wherein the method includes receiving weather data predicting a dangerous weather event to occur within a specified area including a set of buildings of the plurality of buildings, wherein the first building event transaction data represents a first building component, wherein the second building event transaction data represents a second building component, wherein the examining data of the first blockchain block includes determining a first structural integrity rating of the first building component, and wherein the examining data of the second blockchain block includes determining a second structural integrity rating of the second building component, wherein the method includes using the first structural integrity rating and the second structural integrity rating to provide a structural integrity rating of the building, and wherein the method includes using the structural integrity rating of the building to identify the building as a safe building amongst safe buildings in the specified area, wherein the one or more output includes sending a communication to dispatch driverless vehicles to (a) pick up users based on location data specifying locations of the users, and (b) automatically drive the users to buildings of the safe buildings including the building.

18. A system comprising:
  a memory;
  at least one processor in communication with the memory; and
  program instructions executable by one or more processor via the memory to perform a method comprising:
    obtaining first building event transaction data of a building using a first Internet of Things (IoT) device;
    recording a first blockchain block in a blockchain ledger, the first blockchain block having a timestamp and the first building event transaction data;

obtaining second building event transaction data of the building using a second data source selected from the group consisting of (a) a second IoT device disposed at a location of the building, (b) a third IoT device disposed on an autonomous vehicle, (c) a handheld device of a first inspector member, (d) a handheld device of a second inspector member, and (e) an enterprise system of a financial member;

recording a second blockchain block in the blockchain ledger, the second blockchain block having a timestamp, and the second building event transaction data;

examining data of the first blockchain block and the second blockchain block in order to determine the structural integrity of the building; and in response to the examining: adjusting a maintenance schedule for the building and sending navigation data to a first autonomous vehicle for navigating a construction member to the building for maintenance of a building component;

wherein the method includes sending a communication to dispatch one or more second autonomous vehicle to (a) pick up one or more user based on location data specifying location of the one or more user, and (b) autonomously drive the one or more user to one or more safe location.

19. A computer program product comprising:

a computer readable storage medium readable by one or more processing circuit and storing instructions for execution by one or more processor for performing a computer implemented method comprising:

obtaining first building event transaction data of a building using a first Internet of Things (IoT) device;

recording a first blockchain block in a blockchain ledger, the first blockchain block having a timestamp and the first building event transaction data;

obtaining second building event transaction data of the building using a second data source selected from the group consisting of (a) a second IoT device disposed at a location of the building, (b) a third IoT device disposed on an autonomous vehicle, (c) a handheld device of a first inspector member, (d) a handheld device of a second inspector member, and (e) an enterprise system of a financial member;

recording a second blockchain block in the blockchain ledger, the second blockchain block having a timestamp, and the second building event transaction data;

examining data of the first blockchain block and the second blockchain block in order to determine the structural integrity of the building; and in response to the examining: adjusting a maintenance schedule for the building and sending navigation data to a first autonomous vehicle for navigating a construction member to the building for maintenance of a building component;

wherein the method includes sending a communication to dispatch one or more second autonomous vehicle to (a) pick up one or more user based on location data specifying location of the one or more user, and (b) autonomously drive the one or more user to one or more safe location.

\* \* \* \* \*